US006797219B1

(12) United States Patent
Vander Wal et al.

(10) Patent No.: US 6,797,219 B1
(45) Date of Patent: Sep. 28, 2004

(54) METHOD FOR MANUFACTURE OF FLOOR PANELS

(75) Inventors: Nicholas M. Vander Wal, Grand Rapids, MI (US); Richard A. Kroko, Marietta, GA (US); John C. Duba, Jr., Alto, MI (US); Kenneth J. Knister, Ada, MI (US); David J. Levitt, East Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 413 days.

(21) Appl. No.: 09/724,300

(22) Filed: Nov. 28, 2000

(51) Int. Cl.[7] ......................... B29C 71/00; B29C 71/02; B29C 39/10; B28B 7/22; B32B 31/06

(52) U.S. Cl. ......................... 264/233; 264/39; 264/234; 264/265; 264/267; 264/268; 264/297.4; 264/297.5; 264/297.9; 264/333; 264/345; 29/530; 29/897.32; 425/62; 425/120; 425/446

(58) Field of Search ................................ 264/265, 267, 264/268, 297.5, 297.4, 297.9, 233, 234, 333, 345, 39; 29/897.32, 530; 425/62, 120, 446

(56) References Cited

U.S. PATENT DOCUMENTS 1,576,559 A 3/1926 Swift
2,235,001 A 3/1941 All .............................. 25/155
2,522,116 A 9/1950 Hayes .......................... 25/154
2,839,812 A 6/1958 Berliner ........................ 25/154
3,002,247 A 10/1961 Dettling et al. ................ 25/41
3,011,602 A 12/1961 Ensrud et al. ................ 189/34
3,018,209 A 1/1962 Dijksterhuis et al. ....... 154/45.9
3,025,935 A 3/1962 Ensrud et al. ................ 189/34
3,180,460 A 4/1965 Liskey, Jr. ................... 189/34
3,196,763 A 7/1965 Rushton ......................... 94/11
3,218,767 A 11/1965 Stark ........................... 52/381
3,236,018 A 2/1966 Graham et al. ............... 52/619
3,258,892 A 7/1966 Rushton ....................... 52/615
3,396,453 A 8/1968 Thomas, Sr. ................. 29/421
3,396,501 A 8/1968 Tate ............................ 52/173
3,470,663 A 10/1969 Tate ............................ 52/126
3,555,763 A 1/1971 Bloxom ....................... 52/745
3,583,121 A 6/1971 Tate et al. .................... 52/481
3,603,052 A * 9/1971 Novoa ......................... 52/257
3,663,347 A 5/1972 Schoen .......................... 161/6
3,681,862 A 8/1972 Bettinger ...................... 51/126
3,696,578 A 10/1972 Swensen et al. .............. 52/618
3,739,050 A * 6/1973 Koncz et al. ................. 264/39
3,759,009 A 9/1973 Ransome ...................... 52/598
3,778,206 A 12/1973 Barratt ........................ 425/66

(List continued on next page.)

FOREIGN PATENT DOCUMENTS

FR 2416315 A * 10/1979 ............. E04C/2/00
JP 05-133079 A * 5/1993 .......... E04F/15/024
JP 06-317005 A * 11/1994 .......... E04F/15/024

OTHER PUBLICATIONS

Derwent Abstract of FR–2416315–A, 1999, Derwent Information Limited.*
English Machine Translation of JP–05–133079–A, 2004, Japanese Patent Office website.*
English Machine Translation of JP–06–317005–A, 2004, Japanese Patent Office website.*

*Primary Examiner*—Michael P. Colaianni
*Assistant Examiner*—Michael I. Poe
(74) *Attorney, Agent, or Firm*—Foley & Lardner LLP

(57) ABSTRACT

A method for manufacturing tiles for use in a raised floor system is disclosed. The tiles comprise an outer shell and an inner core material. The method includes constructing the shells at a manufacturing facility, transporting the shells to a remote location associated with a job site, and filling the shells with a fill material at the remote location. A method is also disclosed for providing a rack to hold the tiles during the manufacturing process, stacking shells in a vertical orientation on the rack, and filling the shells with a core material while on the rack.

41 Claims, 21 Drawing Sheets

U.S. PATENT DOCUMENTS

| | | | | | |
|---|---|---|---|---|---|
| 3,811,237 | A | | 5/1974 | Bettinger | 52/126 |
| 3,845,593 | A | | 11/1974 | Zen | 52/144 |
| 3,852,928 | A | | 12/1974 | Reith | 52/263 |
| 3,938,295 | A | | 2/1976 | Tate | 52/747 |
| 3,952,402 | A | | 4/1976 | Mengeringhausen | 29/527.1 |
| 3,962,773 | A | | 6/1976 | van der Lely | 29/430 |
| 4,035,967 | A | | 7/1977 | Harvey | 52/126 |
| 4,067,156 | A | | 1/1978 | Downing, Jr. | 52/126 |
| 4,067,941 | A | * | 1/1978 | Gaudelli et al. | 264/69 |
| 4,074,488 | A | | 2/1978 | Ray, III | 52/263 |
| 4,085,557 | A | | 4/1978 | Tharp | 52/263 |
| 4,094,624 | A | | 6/1978 | Halm | 425/434 |
| 4,113,219 | A | | 9/1978 | Mieyal | 248/354 |
| 4,132,043 | A | | 1/1979 | Juba | 52/309.17 |
| 4,203,268 | A | | 5/1980 | Gladden, Jr. et al. | 52/630 |
| 4,203,714 | A | | 5/1980 | Wenander | 425/85 |
| 4,234,534 | A | * | 11/1980 | Ito et al. | 264/328.8 |
| 4,295,319 | A | | 10/1981 | Griffin | 52/785 |
| 4,319,520 | A | | 3/1982 | Lanting et al. | 98/37 |
| 4,342,713 | A | | 8/1982 | Larkfeldt | 264/71 |
| 4,411,121 | A | | 10/1983 | Blacklin et al. | 52/792 |
| 4,423,574 | A | * | 1/1984 | Pierre | 52/202 |
| 4,426,824 | A | | 1/1984 | Swensen | 52/794 |
| 4,447,998 | A | | 5/1984 | Griffin | 52/126.6 |
| 4,453,365 | A | | 6/1984 | Gladden | 52/718 |
| 4,534,924 | A | | 8/1985 | Kariakin | 264/259 |
| 4,561,232 | A | | 12/1985 | Gladden, Jr. et al. | 52/385 |
| 4,573,304 | A | | 3/1986 | Mieyal | 52/807 |
| 4,574,555 | A | | 3/1986 | Cline | 52/785 |
| 4,578,910 | A | | 4/1986 | Germeroth et al. | 52/105 |
| 4,594,833 | A | | 6/1986 | Mieyal | 52/806 |
| 4,606,156 | A | | 8/1986 | Sweers et al. | 52/126.6 |
| 4,621,468 | A | | 11/1986 | Likozar | 51/126.6 |
| 4,625,491 | A | | 12/1986 | Gibson | 52/794 |
| 4,639,204 | A | | 1/1987 | Munsey et al. | 425/3 |
| 4,671,832 | A | | 6/1987 | Cline | 156/73.1 |
| 4,689,870 | A | | 9/1987 | Mieyal | 29/469.5 |
| 4,719,727 | A | | 1/1988 | Cooper et al. | 52/126.6 |
| 4,729,859 | A | | 3/1988 | Munsey et al. | 264/71 |
| 4,745,715 | A | | 5/1988 | Hardwicke et al. | 52/126.6 |
| 4,746,481 | A | | 5/1988 | Schmidt | 264/82 |
| 4,753,058 | A | | 6/1988 | Ray, III | 52/792 |
| 4,825,603 | A | | 5/1989 | Hardwicke et al. | 52/126.6 |
| 4,833,845 | A | | 5/1989 | Brückner et al. | 52/126.6 |
| 4,835,924 | A | | 6/1989 | Blacklin et al. | 52/263 |
| 4,850,176 | A | | 7/1989 | Munsey et al. | 52/829 |
| 4,856,175 | A | | 8/1989 | Swensen et al. | 29/460 |
| 4,856,256 | A | * | 8/1989 | Tokuzo | 52/792.11 |
| D306,350 | S | | 2/1990 | Hardewicke et al. | D25/138 |
| 4,945,701 | A | | 8/1990 | Bell et al. | 52/601 |
| 4,996,810 | A | | 3/1991 | Forde | 52/221 |
| 5,031,368 | A | | 7/1991 | Matthews | 52/126.6 |
| 5,048,242 | A | | 9/1991 | Cline | 52/126.6 |
| 5,088,251 | A | | 2/1992 | Hazeldine | 52/263 |
| 5,096,648 | A | * | 3/1992 | Johnson et al. | 264/245 |
| 5,105,595 | A | | 4/1992 | Tokei et al. | 52/381 |
| 5,111,630 | A | | 5/1992 | Munsey et al. | 52/508 |
| 5,115,621 | A | * | 5/1992 | Kobayashi | 52/792.11 |
| 5,123,435 | A | | 6/1992 | Blacklin et al. | 137/1 |
| 5,229,051 | A | * | 7/1993 | Martin | 264/71 |
| D350,613 | S | | 9/1994 | Fahy, Jr. | D25/138 |
| 5,499,476 | A | | 3/1996 | Adams et al. | 52/220.1 |
| D370,060 | S | | 5/1996 | Fahy, Jr. | D25/128 |
| 5,749,188 | A | | 5/1998 | Belbenoit | 52/263 |
| 5,853,512 | A | * | 12/1998 | McKinney | 156/78 |
| 6,638,393 | B2 | * | 10/2003 | Lehan | 156/346 |
| 2004/0007797 | A1 | * | 1/2004 | Minke et al. | 264/333 |

* cited by examiner

METHOD FOR MANUFACTURE OF FLOOR PANELS

FIELD OF THE INVENTION

The present invention relates to the system and method for manufacture of floor panels.

BACKGROUND

It is well known to provide for a raised floor system that includes floor panels installed in a grid upon a supporting structure such as stanchions. Such known floor systems typically provide for floor panels that are composed of a structure or shell (typically steel) and a fill material. The fill material is typically an aggregate or cementitious mixture (e.g., Portland cement and/or gypsum) and is filled into the shell and allowed to cure to form the floor panel. The fill material is intended to strengthen the panel, improves acoustic and heat transfer properties and flame resistance. Manufacture of such floor panels is typically completed at the manufacturing facility remote from the location at which the floor panels (i.e. the raised floor system) is to be installed. However, the result is a relatively heavy product (i.e. a complete floor panel of a 24 inch by 24 inch size may weigh approximately 20 to 40 pounds) that must be shipped to the installation site. Shipping of such floor panels by conventional means such as a tractor-trailer presents inefficiencies insofar as the shipping container reaches its maximum weight capacity well before it approaches its maximum volume capacity (e.g., a 48 foot trailer may reach total weight capacity or limit at approximately 1,425 floor panels but uses only approximately 30 percent of the total volume capacity at that limit). Moreover, shipping costs can become a not insubstantial portion of total product cost (e.g., approximately 20 to 25 percent for floor panels shipped from the Midwest to the Western United States). Furthermore, the handling of complete floor panels during shipping tends to be difficult due to the weight and shape (e.g., product yield may be reduced due to damage in shipment). Portland cement and gypsum are regionally available across the country and can be shipped more efficiently in bulk.

Accordingly, it would be advantageous to provide for a system and method of manufacturing floor panels that allows for the realization of cost efficiencies of manufacturing and shipping. It would also be advantageous to provide for a system and method that allows for the shells of the floor panels to be manufactured at a remote site and delivered to or near an installation site along with fill material in bulk so that the manufacture of floor panels can be completed at or near the installation site. It would further be advantageous to provide for a system and method of manufacturing floor panels that employs a material handling system (e.g. reusable and nestable racks or the like) that are configured to improve space and cost efficiency during shipment and handling. It would further be advantageous to provide for a system and method of manufacturing floor panels through which the equipment used to complete the manufacture of the floor panels can be installed in a local facility and/or a transportable mobile unit located near the installation site. It would be further advantageous to provide a system and method of manufacturing floor panels employing a carrier that may be used throughout multiple manufacturing operations to reduce handling (e.g., in an effort to achieve a reduction in scrap loss due to shipping or handling damage) and improve throughput.

Accordingly, it would be desirable to provide for the manufacturing of raised floor panels having one or more of these or other advantageous features.

SUMMARY

The present invention relates to a method for manufacturing tiles for use in a raised floor system, the tiles comprising an outer shell and an inner core material, the method comprising steps of constructing the shells at a manufacturing facility; transporting the shells to a remote location associated with a job site; and filling the shells with a fill material at the remote location.

The present invention also relates to a method for manufacturing tiles for use in a raised floor system, the tiles comprising an outer shell and an inner core material, the method comprising steps of constructing the shells at a manufacturing facility; providing a rack to hold the tiles during the manufacturing process, stacking the shells in a vertical orientation on the rack; transporting the shells to a remote location associated with a job site while on the rack; and filling the shells with a core material while on the rack at the remote location.

DETAILED DESCRIPTION OF THE PREFERRED EMBODIMENT AND OTHER EXEMPLARY EMBODIMENTS

Figure 1:
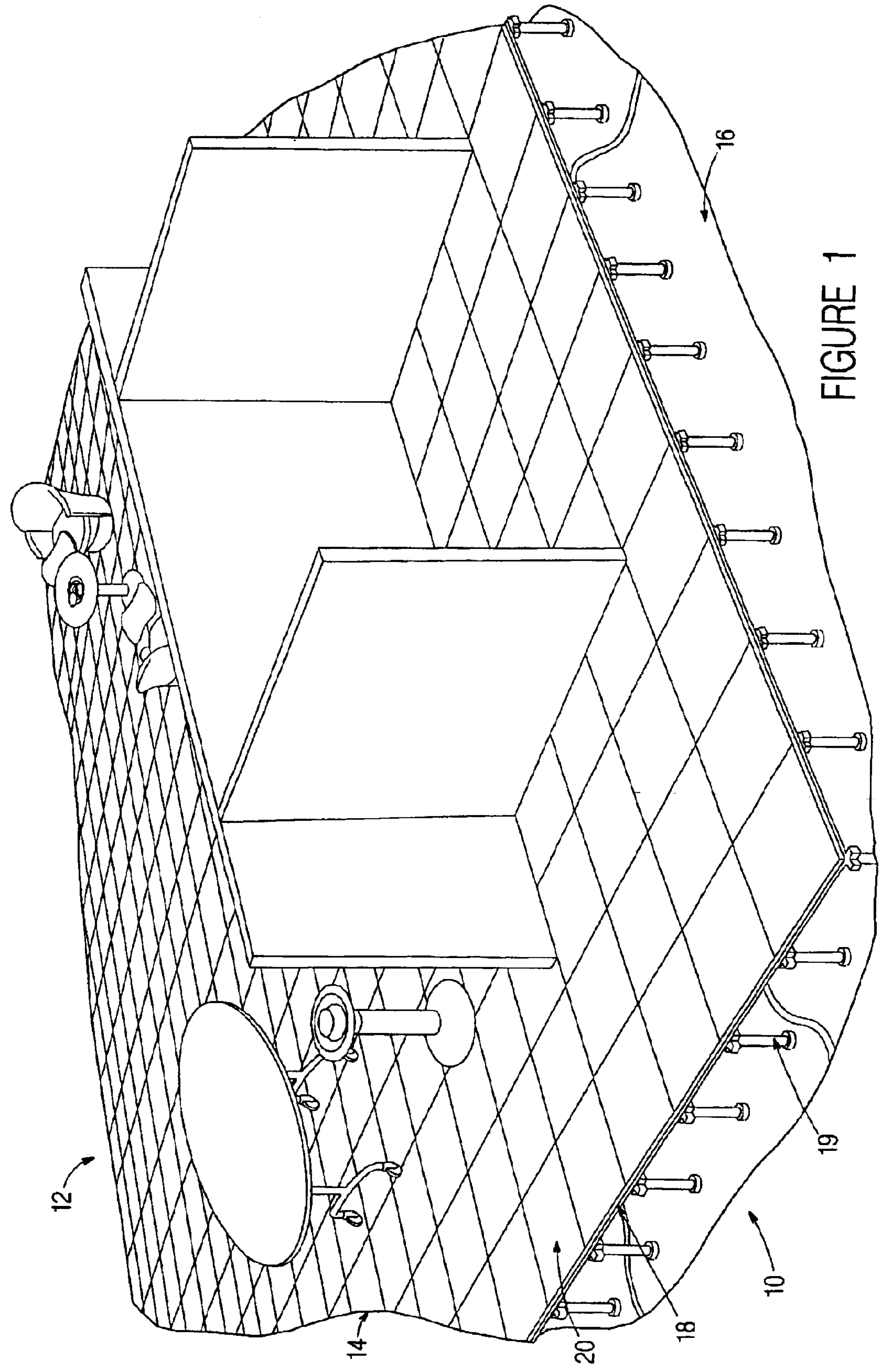
FIG. 1 is a perspective view of a work environment according to a preferred embodiment.

Referring to FIG. 1, a floor system 10 is shown in a work environment 12 according to a preferred embodiment of the present invention. Floor system 10 is configured for use in a work environment 12 such as an office or the like according to any preferred embodiment, but may be used in a wide variety of other spaces according to alternative embodiments. System 10 provides a raised floor 14 installed above a sub-floor 16 (e.g., poured concrete floor). Raised floor 14 is formed from a plurality of panels 20 which are typically arranged in a grid-like pattern to form a floor surface 18 shown in a horizontal plane. Raised floor 14 is supported above sub-floor 16 by a supporting structure including stanchions 19 that receive one or more panels 20 on a top end and distribute the vertical load from raised floor 14 to sub-floor 16. According to any preferred embodiment, the system may provide a raised floor with panels and stanchions of a conventional type.

Panels 20 may be composed of an exterior shell 22 (or frame) that forms a hollow panel body surrounding an interior cavity (not shown). According to any preferred embodiment, the shells are formed of a sheet material (e.g., stamping of sheet metal) and manufactured at a remote or "initial" facility and shipped with the interior cavity "empty" and to be filled (e.g., to produce finished panels) at or near a local or "final" facility near an installation site 46. (According to any particularly preferred embodiment, the shell will weigh substantially less than the filled panel, for example between approximately 3 pounds or less to approximately 8 to 10 pounds or more). The cavity may be filled with a cementitious or aggregate fill material (not shown) that hardens and bonds upon curing and adds strength and rigidity to the structure of shell 22 to form a panel 20 suitable for installation on the supporting structure to form the raised floor. According to any preferred embodiment, fill material may use any suitable composition or mixture of commercially available material that cures within approximately 5 to 20 minutes. According to a particularly preferred embodiment, the fill material is a mixture of Portland cement and gypsum commercially available from and manufactured by the U.S. Gypsum Corporation of Chicago, Ill. According to alternative embodiments, other suitable fill materials (known or developed) may be used.

Figure 2A:
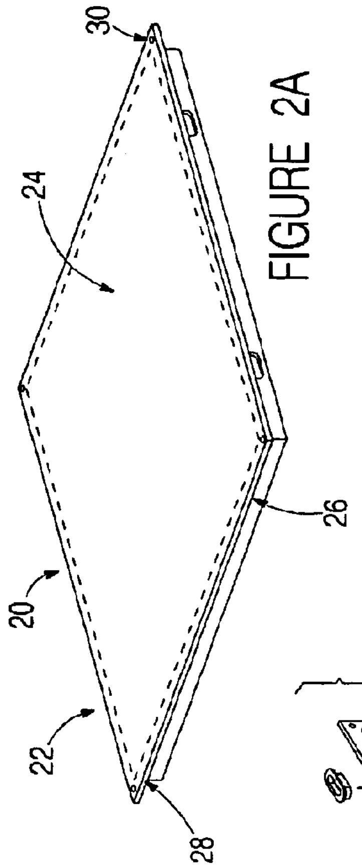
FIG. 2A is a perspective view of a panel according to a preferred embodiment.

Referring to FIG. 2A, shell 22 of panel 20 is shown according to a preferred embodiment of the present invention. Shell 22 may have a top surface portion 24 that projects beyond a base or body 26 to create a ledge 28 (that may rest on stanchion 19 when panel 20 is installed). Ledge 28 may have corner apertures 30 used to fasten panels 20 to stanchion 19 with a suitable fastener such as a screw (not shown). In a particularly preferred embodiment, shell 22 of panel 20 is made from a durable material (e.g., steel, etc.) and shaped in the form of a square (e.g., 24 inches by 24 inches in a particularly preferred embodiment). Shell 22 may have a base or body 26 of sufficient depth to create an internal cavity (not shown) that upon filling provides the necessary strength to support loads applied over the area spanned by panel 20. In alternative embodiments, the shell may be made from plastic or a combination of steel and plastic.

Figure 2D:
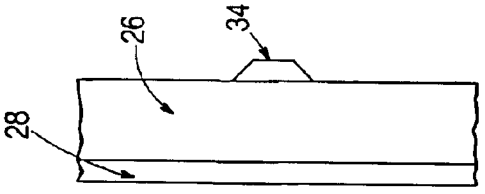
FIG. 2D is a side elevation of the panel.
Figure 2C:
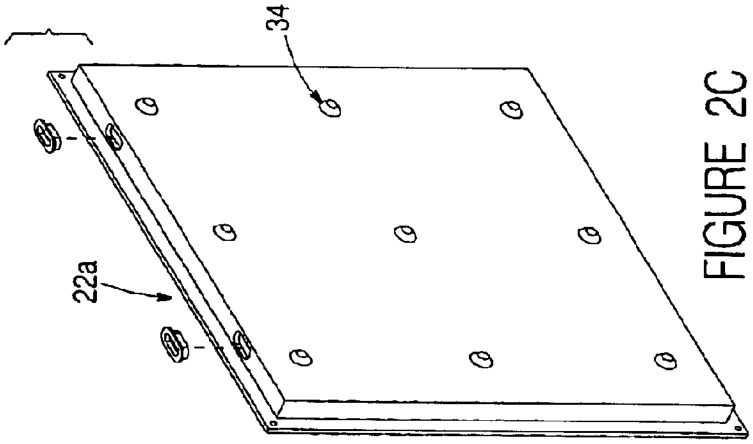
FIG. 2C is a perspective view of a panel according to an alternative embodiment.
Figure 2B:
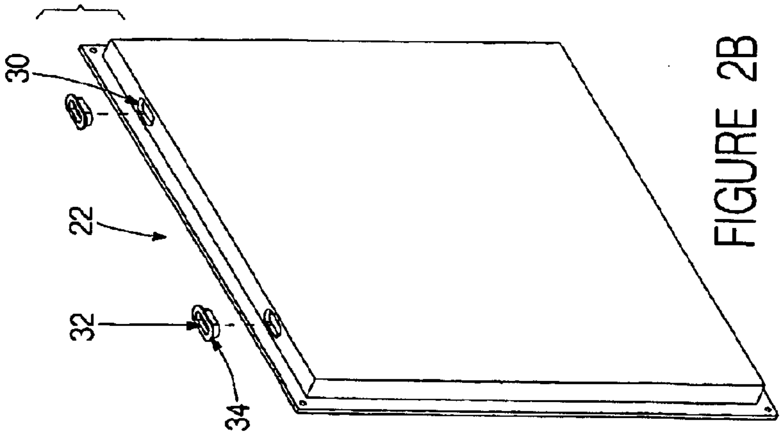
FIG. 2B is a perspective view of the panel.

Referring to FIG. 2B, shell 22 is shown with fill apertures 30 according to a preferred embodiment. One or more fill apertures 30 (two are shown) may be provided on body 26 and located so that shell 22 can be positioned with fill apertures 30 in a suitable position (e.g., at a high point) to facilitate "flow" and complete filling of body 26 with fill material (e.g., a liquid-aggregate mixture) and to allow air in the cavity to escape during the fill operation. According to a particularly preferred embodiment, two fill apertures 30 (e.g., holes) having an oblong shape are provided on one side of body 26. One or more removable covers 32 (e.g., of a compliant material such as plastic, rubber or other elastomeric material) are provided to close the one or more fill apertures 30 upon completion of the fill operation. According to a particularly preferred embodiment, covers 32 are shaped to conform for insertion within fill apertures 30 with an interference fit and may have an outwardly projecting lip 34 to seat against body 26 when cover 32 is fully inserted into fill aperture 30 and provide an accessible surface for removing cover 32. In alternative embodiments, the cover or plug for the fill holes may not have an exterior lip and may be sized for an interference fit in fill aperture 30.

Figure 15:
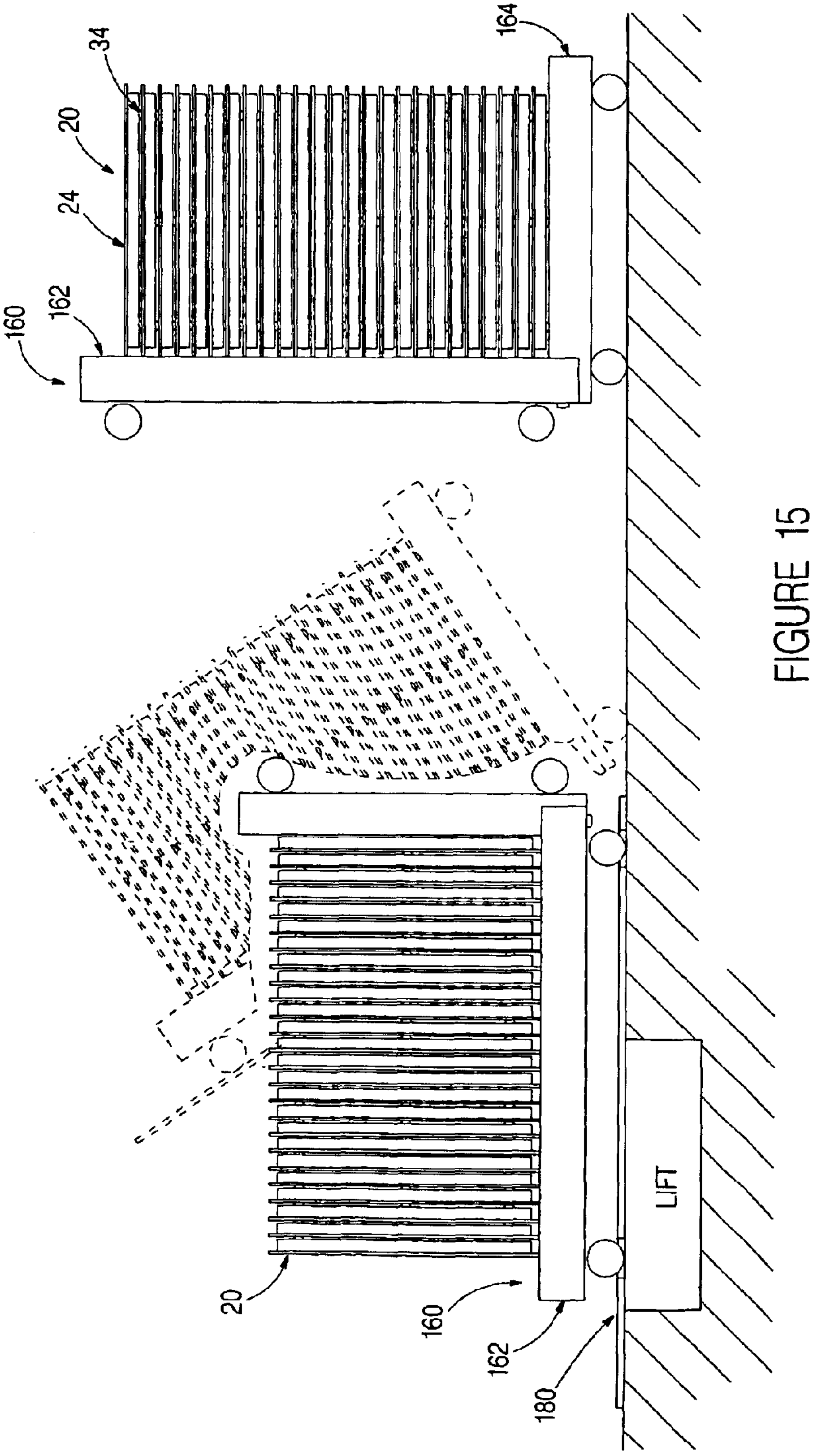
FIG. 15 is a side elevation view of a loaded cart according to a preferred embodiment.

Referring to FIG. 2C, shell 22 is shown with a plurality of projections 34 (e.g., bosses) located on the underside of body 26 for providing an offset from the top surfaces 24 of panels 20 when stacked (e.g., as shown in FIG. 15). The space created by the offset between adjacent panels 20 facilitates washing of the adjacent panel surfaces. The projections may be integrally formed (as shown) or may be attached to the base or body of the shell or the panel. According to a particular preferred embodiment, projections 34 are of a frustoconical shape (as shown in FIG. 2D) and formed into body 26 (e.g., by stamping) and to facilitate recycling by eliminating material separation required with externally applied projections. Alternatively, projections 34 may be made of rubber, another elastomeric material or other suitable material (e.g., having resilient properties). According to other alternative embodiments, projections 34 may have any suitable shape to provide an offset and/or "cushion" between adjacent stacked panels 20. The projections may be located on the body of the shell in any suitable arrangement, and attached by any suitable method including but not limited to, a mechanical connection or an adhesive. According to any preferred embodiment, the projections and/or the spacing of the panels in the rack or carrier will facilitate flow of water (e.g., washing).

Figure 3:
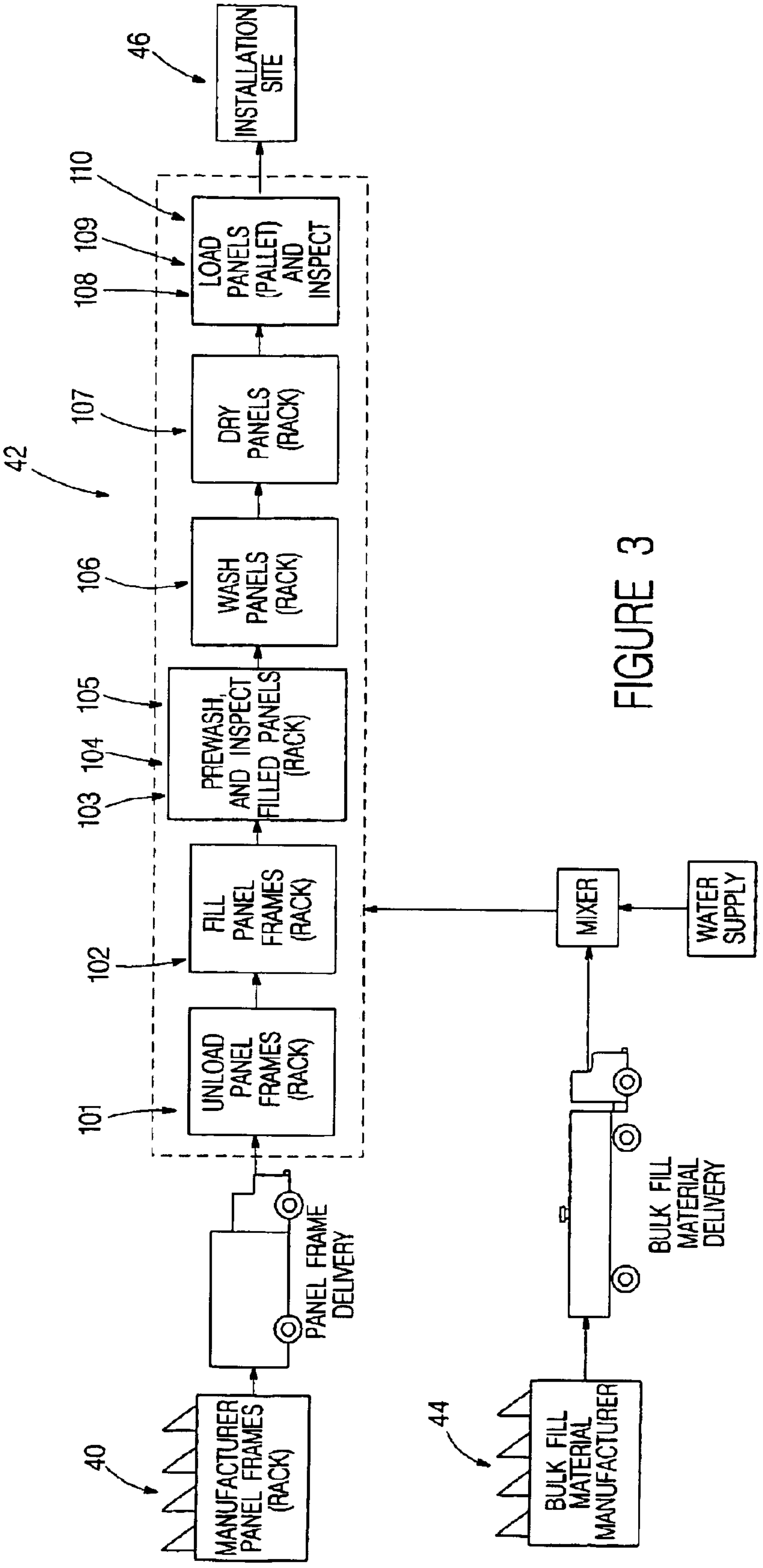
FIG. 3 is a schematic diagram of a system and method for the manufacture of floor panels according to a preferred embodiment.

Referring to FIG. 3, a schematic diagram of the manufacturing process for manufacturing panels 20 is provided according to a preferred embodiment. Shells 22 are produced at a remote or "initial" manufacturing facility 40 (e.g., a manufacturing plant) having high volume production capability and placed in racks 50 (shown in FIG. 4A) and stacked (shown in FIGS. 9 and 10) for delivery to a local or "final" manufacturing facility 42. According to a particularly preferred embodiment, "final" manufacturing facility 42 is located at or near an installation site 46 for floor system to allow local manufacture and delivery of a desired quantity of panels to a local user or installation site. The facility (e.g., for manufacturing the required number of panels) may be a suitably-equipped truck or trailer that is parked or "installed" at or near the installation site or a "local" plant or warehouse that is suitably equipped. According to any preferred embodiment, the capability to manufacture panels "locally" at an installation site is intended to improve cost efficiency and to reduce the environmental impact of delivering the panels to a "local" installation site insofar as panel shells are delivered in quantity and fill material is delivered in bulk (each in a cost-efficient manner).

Figure 9:
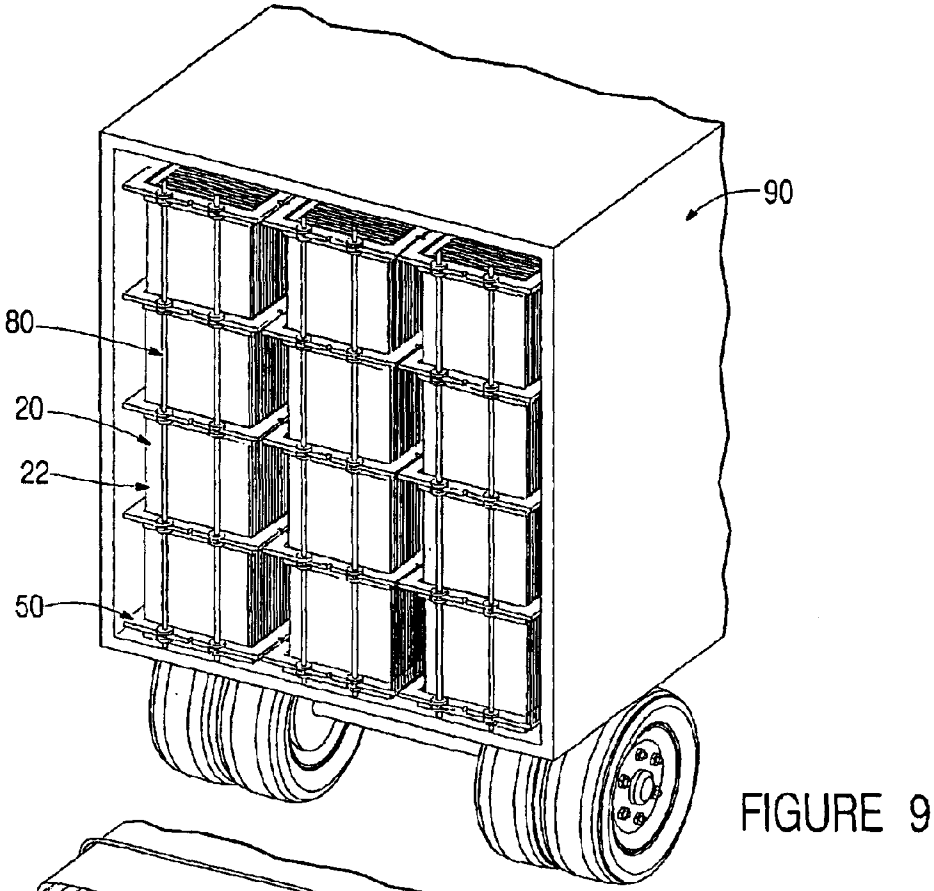
FIG. 9 is a perspective view of a loading configuration for stacked (loaded) racks on a transport carrier according to a preferred embodiment.
Figure 10:
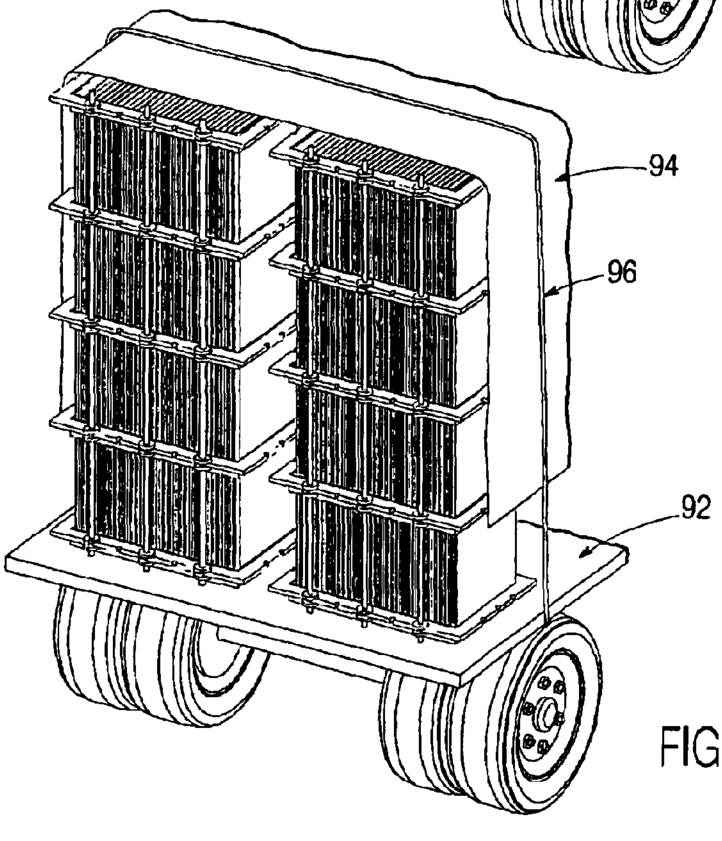
FIG. 10 is a perspective view of a loading configuration for stacked (loaded) racks on a transport carrier according to a preferred embodiment.
Figure 11:
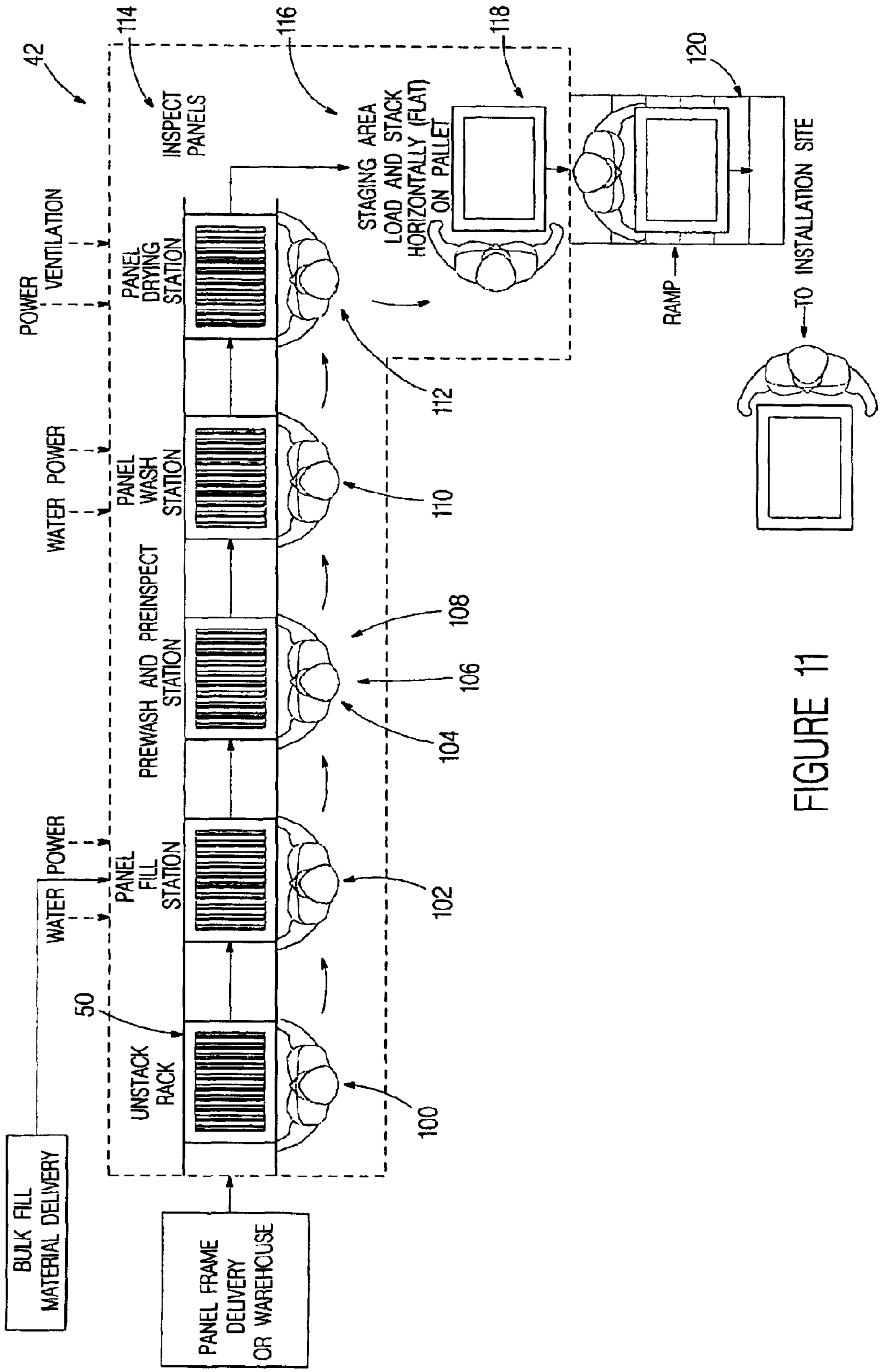
FIG. 11 is a schematic diagram of a system and method for the manufacture of floor panels according to a preferred embodiment.
Figure 12:
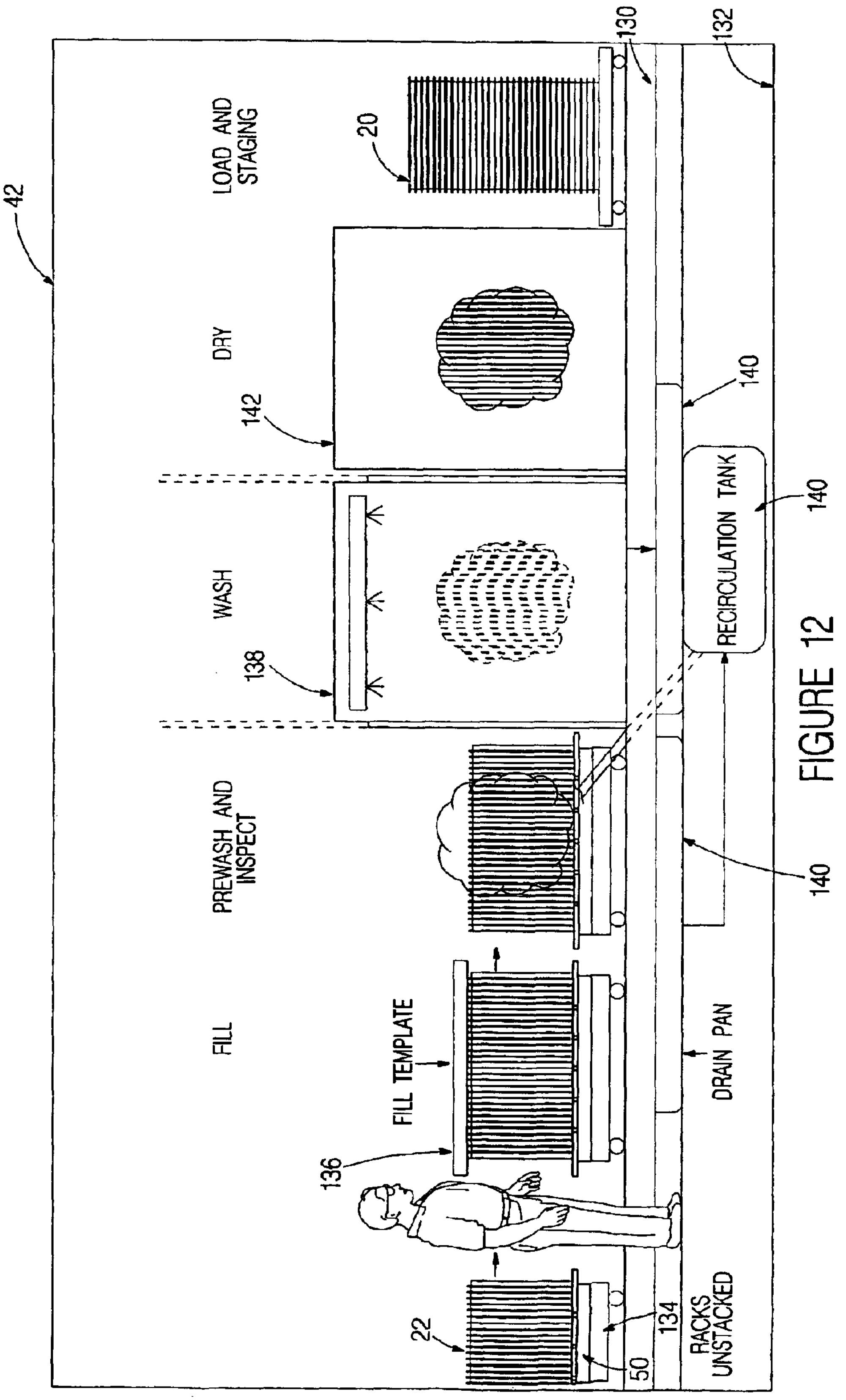
FIG. 12 is a side elevation view of the system and method for the manufacture of floor panels.

As shown in FIGS. 3, 11 and 12, the local or "final" manufacturing process may include a plurality of operations. In a particularly preferred embodiment, these operations may include, among other operations, an unloading operation (step 101) for unloading and unstacking racks 50 received from a delivery vehicle (such as a trailer as shown in FIGS. 9 and 10) containing shells 22 (e.g., unfilled panels as shown in FIG. 2A); a fill operation (step 102) for filling the shells (at their fill apertures) with an aggregate or cementitious (or other) material delivered in bulk from a bulk fill manufacturing facility 44 and mixed (as necessary) in a mixer with a water from a water supply; an inspection operation (step 103) for inspecting the fill level within the shells (and refilling as and if necessary); a closing operation (step 104) for inserting covers (or caps) into the fill apertures when the shells have been filled and inspected; a prewash operation (step 105) for prewashing panels (e.g., filled) to remove excessive quantities of fill material that may have accumulated during the fill operation from the exterior of panels; a washing operation (step 106) for washing the exterior of the panels to clean generally and specifically to remove residual fill material or other foreign matter; a drying operation (step 107) for drying panels; a final inspection operation (step 108) for inspecting the quality and readiness of finished panels (e.g., for fill, weight and appearance); a staging operation (step 109) for transferring the panels from racks to pallets and/or a movable cart (shown in FIG. 14A); and a local delivery operation (step 110) for delivering panels to installation site 46. According to other alternative embodiments, the process may include fewer operations, or more operations, or other variations in the order or sequence of operations as appropriate for manufacture of the panels.

Figure 4A:
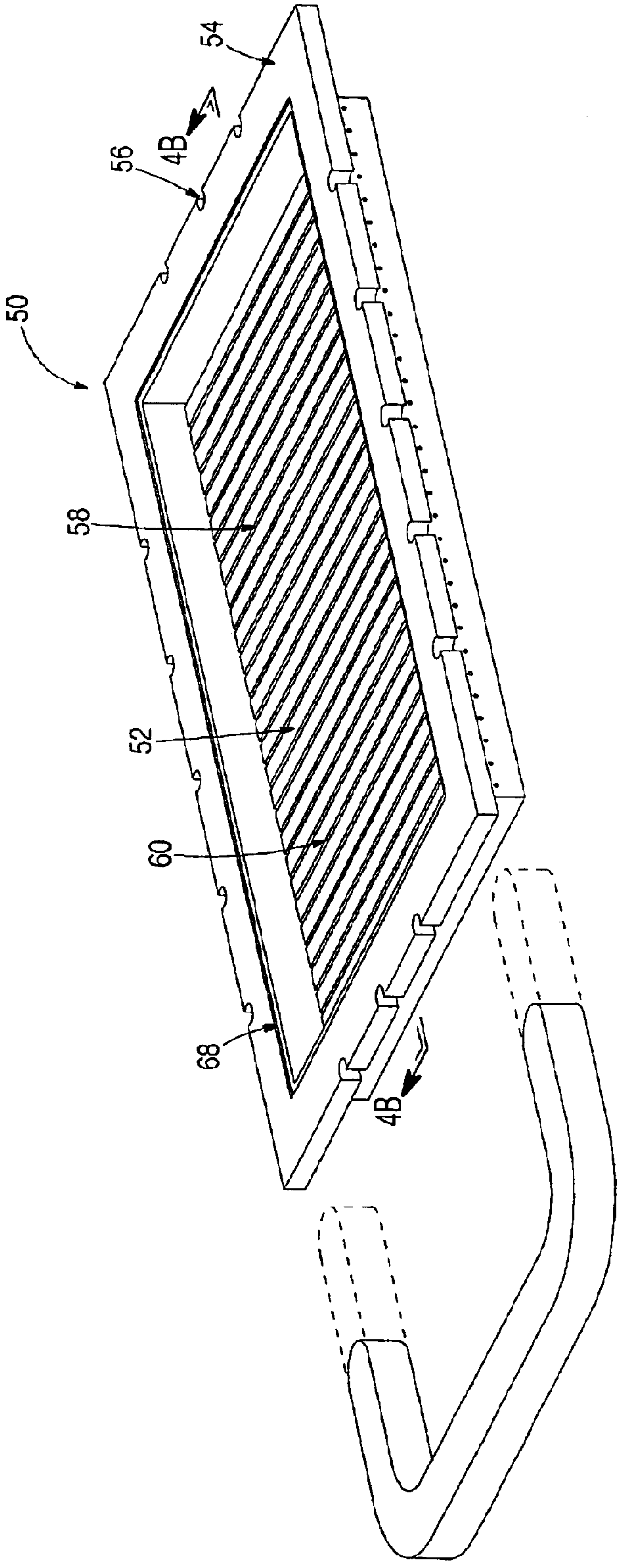
FIG. 4A is a perspective view of a rack (or carrier) for panels (or frames).
Figure 4B:
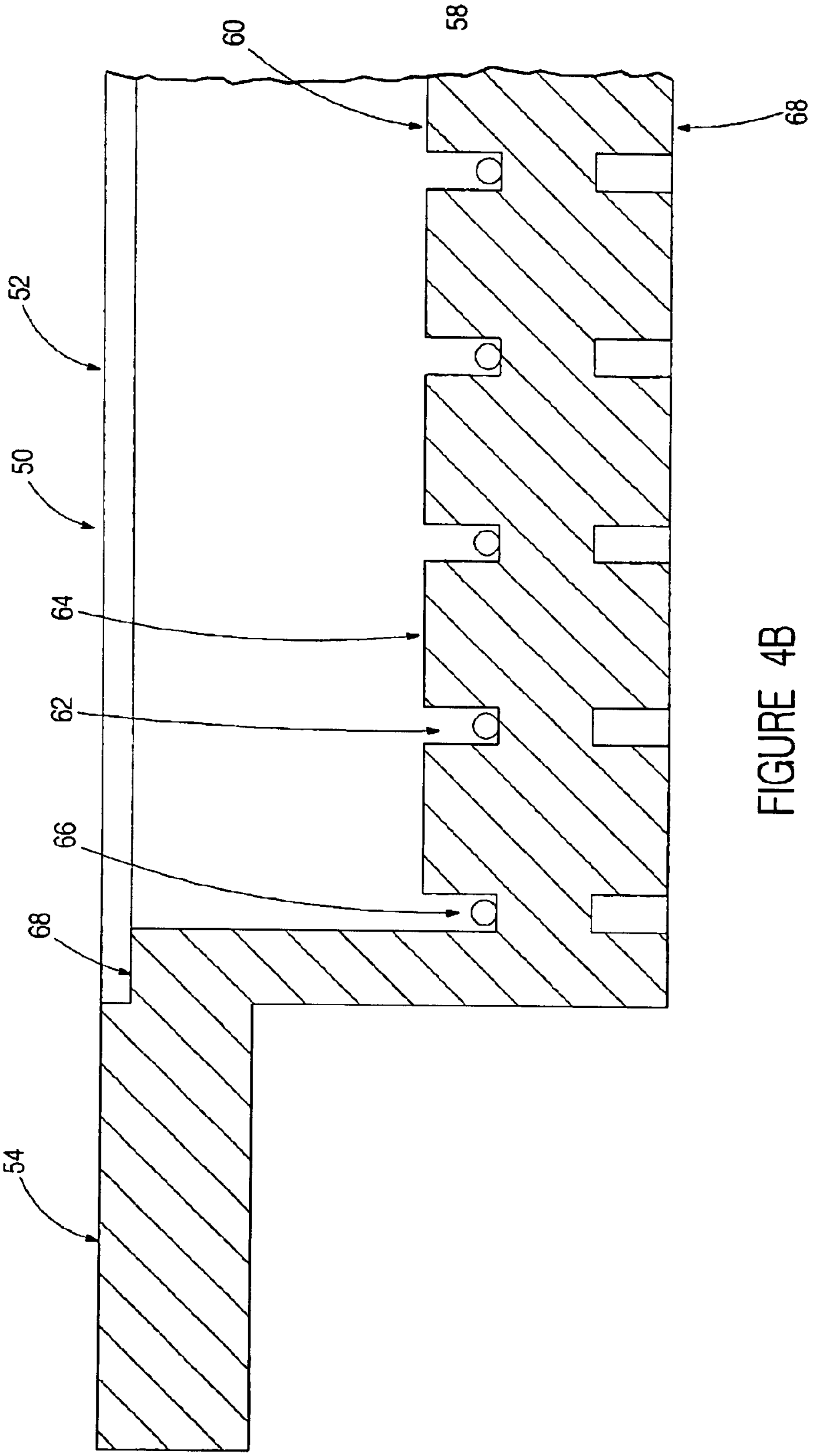
FIG. 4B is a cross sectional view of the rack.

Referring to FIGS. 4A and 4B, a carrier shown as rack 50 is shown according to a preferred embodiment. Rack 50 is generally rectangular and may have any suitable size for holding a plurality of panels (i.e. filled) or shells (i.e. unfilled). Rack 50 may provide a rigid and sound structure for holding panels 20 or shells 22 for a multitude of purposes including, among others, shipping, filling, washing, drying, inspecting and delivery. According to any particularly preferred embodiment, the rack is rectangular in shape and of a size intended to hold and protect (in a "dense" or tight arrangement) shells and panels from the "initial" manufacturing process (e.g., of the shells), for delivery to the local or "final" manufacturing facility, through the "final" manufacturing process-and possibly to the installation site. According to a particularly preferred embodiment, the rack is intended to protect the panels and shells as well as to improve space and weight efficiency for shipping as well as for use in the manufacturing process (e.g., to improve the weight to volume ratio for shipping). In a particularly preferred embodiment, the rack is made of a durable and/or recyclable material (e.g., structural plastic). According to other alternative embodiments, the rack may be composed of any suitable, water-resistant and recyclable material (e.g., steel, aluminum, rigid plastic, etc.) having the strength necessary for carrying a plurality of panels (e.g., filled).

As shown, rack 50 includes a central portion 52 (e.g., for carrying shells or panels) and a ledge 54 surrounding the perimeter and projecting from a top surface of rack 50. Ledge 54 and may have a plurality of edge cut-outs 56 ("omega-shaped" notches) for receiving a support or stabilizer 80 (shown in FIG. 7). In a particularly preferred embodiment, the ledge 54 may have an exterior perimeter approximately 45 inches long and approximately 31 inches wide and sized for engagement by a mobile lifting vehicle (e.g. forklift, etc.) (as well as for packages). Central portion 52 may have a base 58 providing a series of holders 60 on the top of base 58 for holding a bottom end of a panel 20 or shell 22 in a vertical orientation. Holders 60 are provided by an alternating series of notches or slots 62 and raised sections or beams 64, having a size and shape so that a side edge of body 26 of shell 22 of panel 20 rests on beam 64 and ledge 28 extends into slot 62 (e.g. preferably without contacting the bottom of slot 62 so that the outer edge of ledge 28 does not bear the weight of the panel). Apertures or drains 66 are provided through the sides of rack 50 at the bottom of one or both ends of each slot 62 to allow water to drain from rack 50 during the prewash operation (step 105) and the washing operation (step 106). In a particularly preferred embodiment, drains 66 are horizontal but may be sloped downward and away from the base surface to facilitate drainage (or given any other suitable orientation). The bottom of base 58 may have a series of similarly configured holders 68 (i.e., beams 64 and slots 62) arranged symmetrically or generally in alignment with holders 60 located on the top surface of base 58 for receiving ledges 28 located on the top of panels 20 or shells 22 from a to similar rack when vertically stacked (e.g. in what is intended to be a secure interfit convenient for transport).

Figure 5:
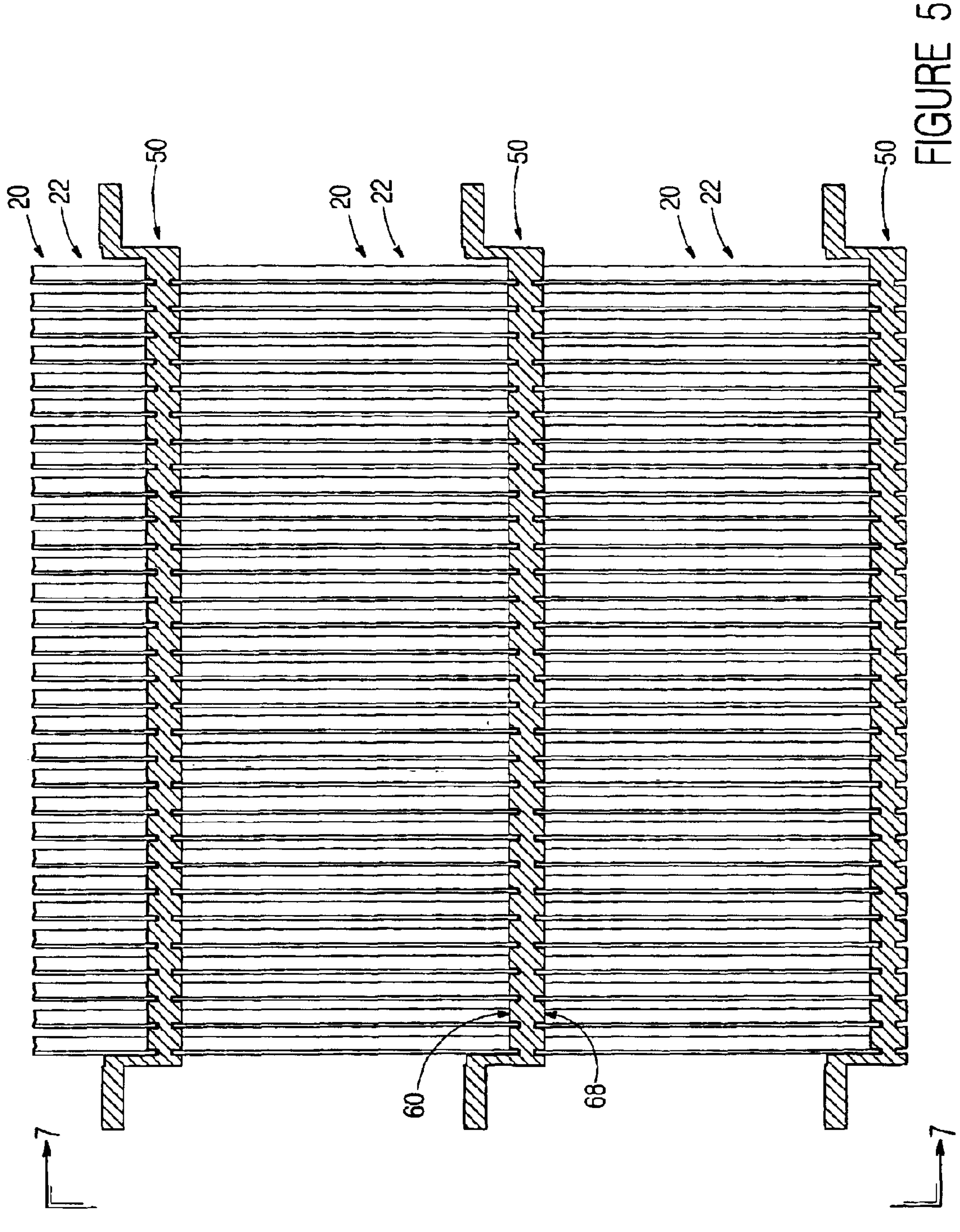
FIG. 5 is a cross sectional view of stacked racks.
Figure 8:
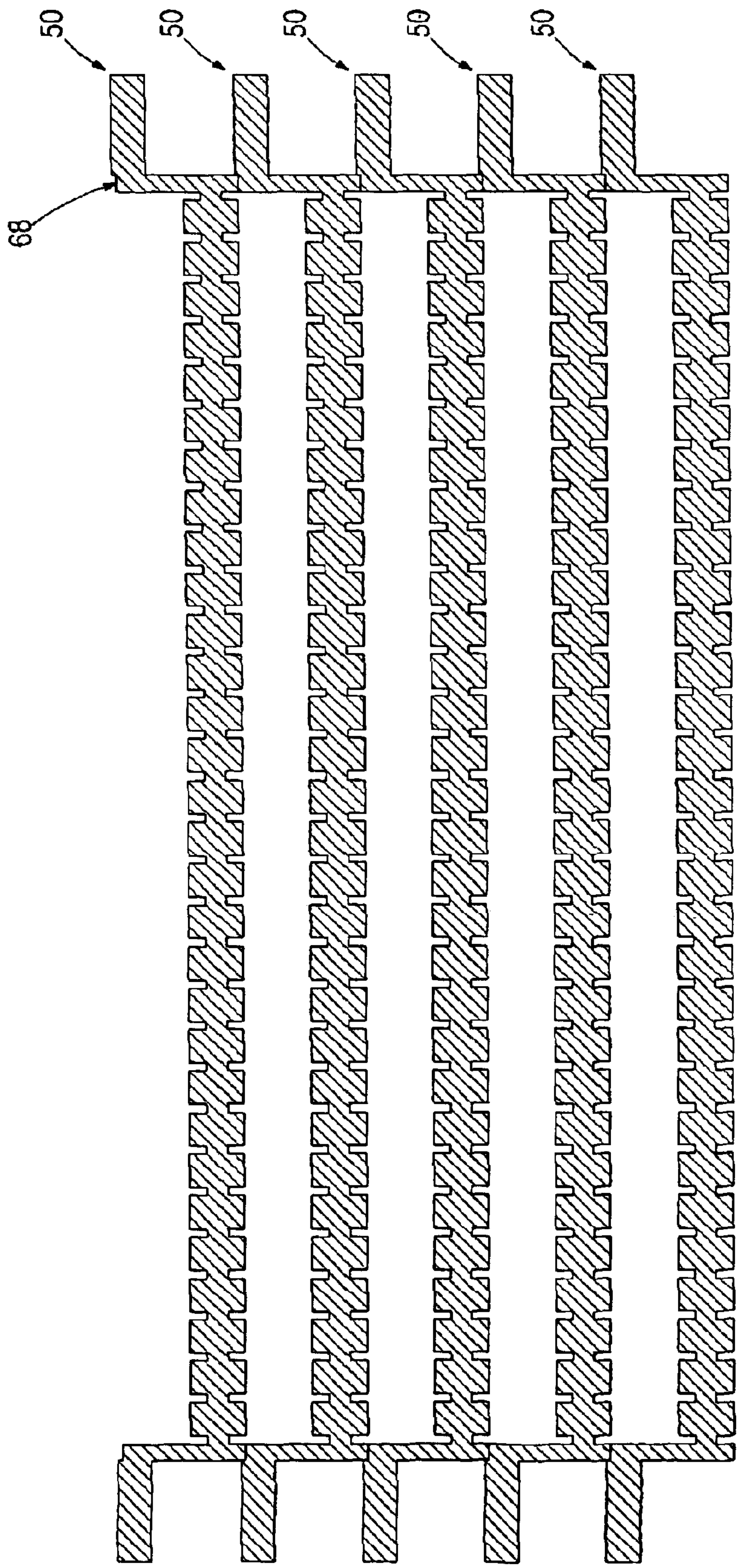
FIG. 8 is a cross sectional view of stacked (empty) racks.

Referring to FIG. 5, a series of vertically stacked racks 50 holding panels 20 or shells 22 is shown according to a preferred embodiment. Racks 50 may have a series of holders 60 positioned on a bottom side of base 58 for receiving and protecting ledges 28 of panels 20 or shells 22. According to a particularly preferred embodiment, holder 60 and holder 68 on the top and bottom of base 58 are aligned or symmetrically configured to allow racks 50 filled with panels 20 or shells 22 to be vertically aligned and stacked to improve shipping density and protect panel ledges 28. Panels or shells at the ends of central portion 52 are maintained vertical by the interior ends of rack 50; interior panels or shells are "captured" and maintained in a generally vertical orientation between the end panels or adjacent panels or shells. A peripheral cut-out or recess 68 may be provided along the inside edge of rack ledge 54 to allow multiple racks 50 to be nested together in a compact vertical stack when empty (e.g. convenient for transport as shown in FIG. 8). According to alternative embodiments, other carrier or rack arrangements may be employed.

Figure 6A:
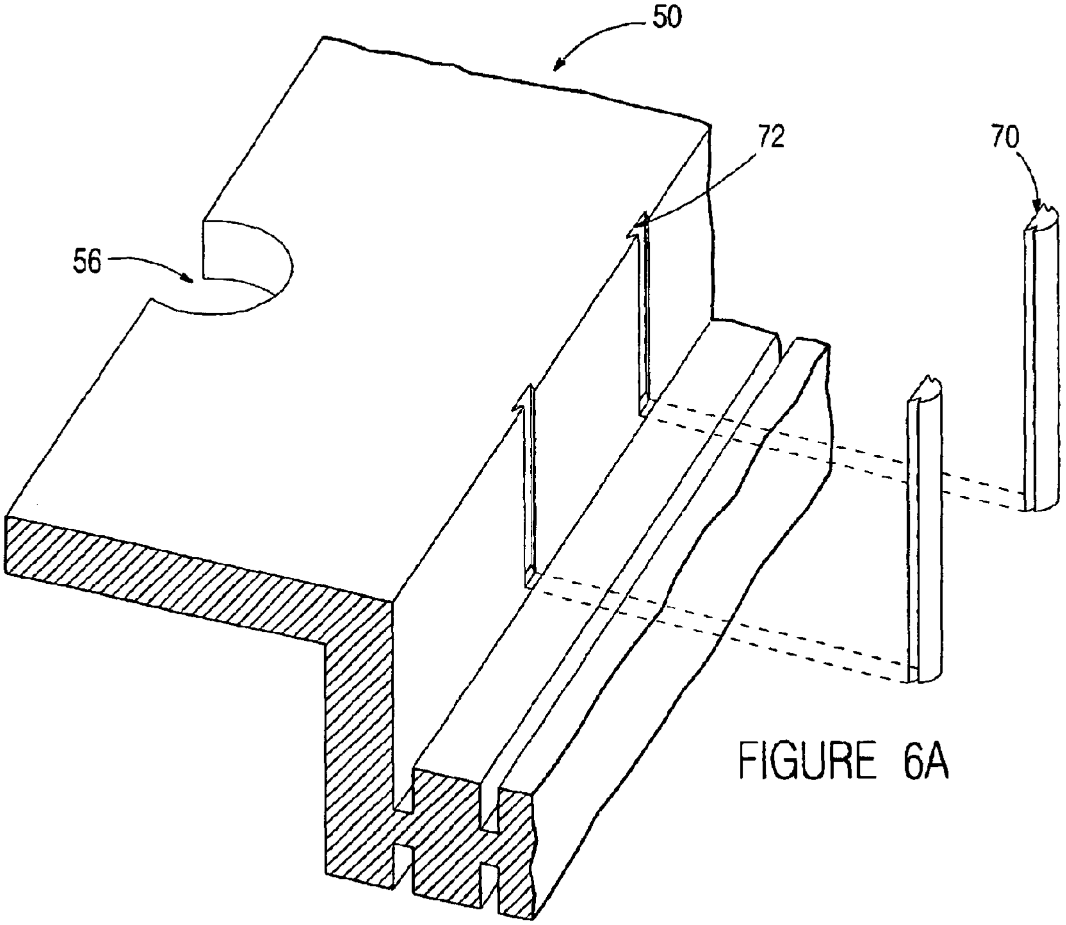
FIG. 6A is a fragmentary perspective view of a rack according to a preferred embodiment.
Figure 6B:
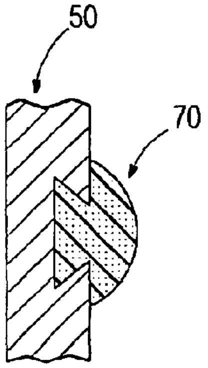
FIG. 6B is a fragmentary cross sectional view of the rack.
Figure 6C:
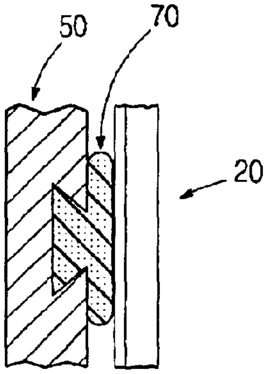
FIG. 6C is a fragmentary cross sectional view of the rack.

Referring to FIG. 6A, one or more strips or protectors 70 for protecting the top surface of panels 20 or shells 22 from abrasive contact with the interior ends of rack 50 are shown according to a preferred embodiment. Protectors 70 may be made of a resilient material such as urethane, rubber (or another elastomer) and shaped for slidable but secure installation and removal (e.g., into keyways 72 spaced along the interior end walls of rack 50). Protectors 70 may have a rounded profile extending inward from the end walls of rack 50 (as shown in FIG. 6B) to cushion and protect the top surface 24 of shells 22 or panels 20 (as shown in FIG. 6C). Protectors 70 may also have a length that projects slightly above the top of rack 50 readily to allow a manual grasping and slidable removal from keyway 72 (e.g. for replacing worn protectors 70).

Figure 7:
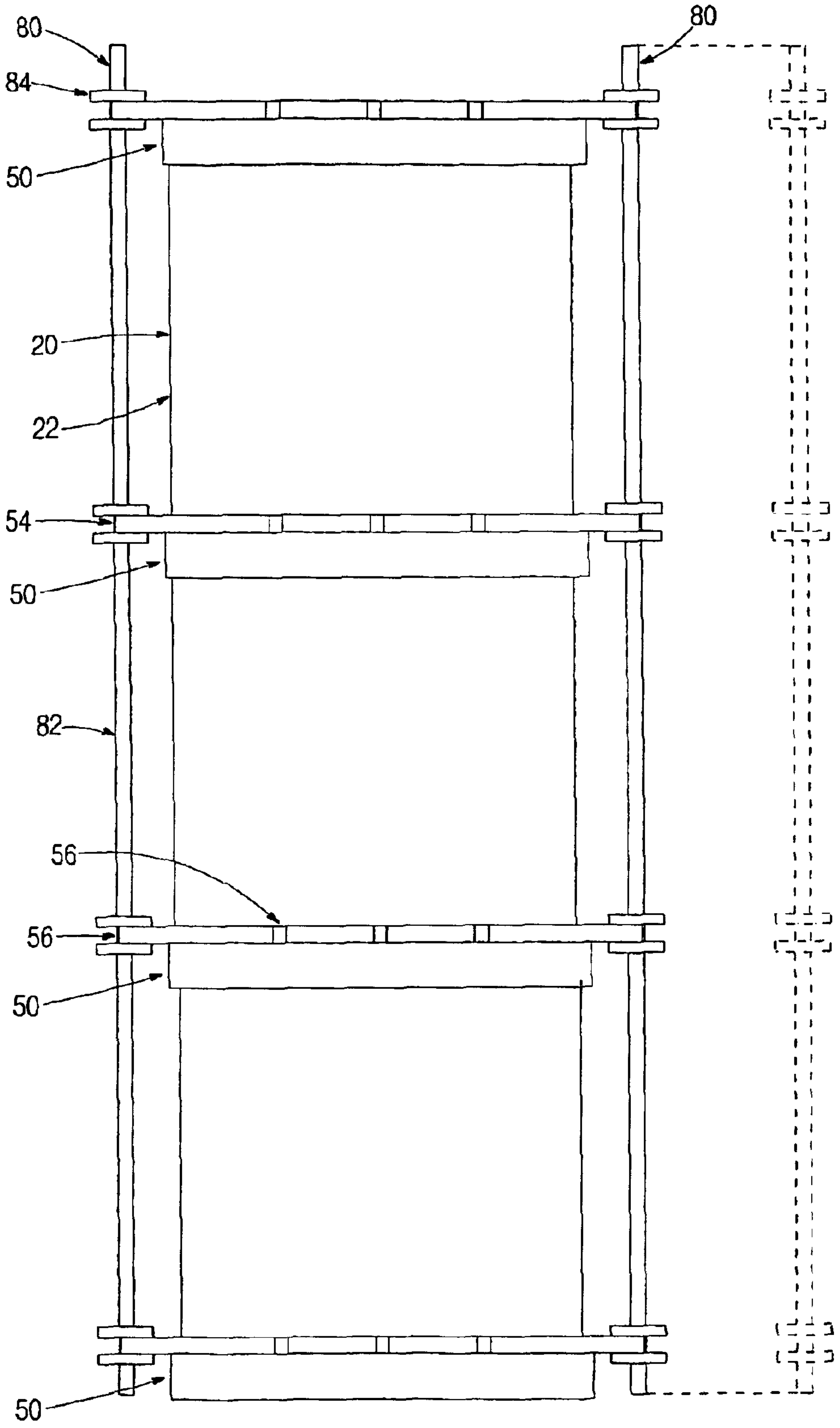
FIG. 7 is a side elevation view of stacked (loaded) racks.

Referring to FIG. 7, according to a preferred embodiment a vertical stack of racks 50 filled with panels 20 or shells 22 may be laterally supported by supports 80; a top rack (e.g., cover) may be provided on top of the stack to secure and protect the top ledges 28 of the panels 20 or shells 22 in the upper most rack. (According to an alternative embodiment, the top rack may serve as a cover when inverted also to provide additional stability for a stack of filled racks.) As shown in FIG. 7, supports 80 may be rods 82 sized to span the height of a particular number of stacked racks 50 and for removable attachment to each rack 50 to increase lateral stability during shipping and storage (and generally to rigidity the stack of filled racks). A plurality of supports 80 may be installed around the perimeter of racks 50 to provide enhanced stability. According to a particularly preferred embodiment, supports 80 may be a steel bar or plastic rod having a circular cross section adapted to engage notches 56 (e.g. by a "press" or "fastenerless" interference fit) within ledge 54 of each rack 50; a plurality of spacers shown as circular flanges 84 may be provided on supports 80 and to capture ledge 54 or "index" rod 82 on each rack 50 and to restrict vertical movement. According to alternative embodiments, the supports (e.g., rods) or notches may be made of any suitable material profile or shape for secure engagement; the supports may be oriented vertically or at an angle or in another interfitting relationship (e.g., flanges may or may not be provided and if provided may have any suitable shape for enhancing the "fit" of supports and for restricting movement). According to another alternative embodiment, the supports may also engage the edge cut-outs of the rack by use of fasteners (such as threaded fasteners) or a latch or lock bar that slides axially through edge cut-outs and is fixed in position by locking pins (not shown).

Referring to FIG. 8, empty racks 50 may be nested together in a compact vertical stack according to any preferred embodiment. Racks 50 may have a cut-out or recess 68 surrounding the interior perimeter of ledge 54, and sized to receive and "mate" with the bottom of a similar or identical rack 50 in a generally secure stacked configuration. According to a particularly preferred embodiment, recess 68 of lower rack 50 is uniformly sized to nest with or retain the bottom edge of a corresponding stacked rack 50 while providing sufficient "clearance" to facilitate separation of the racks without allowing substantial relative motion between stacked racks as may disrupt shipping and handling stability. According to an alternative embodiment, a bottom recess may be provided around the bottom exterior of the rack so as to engage the top interior edge of a the ledge on a corresponding stacked rack. Other stacking configurations may also be provided to engage corresponding stacked racks such as a series of mating projections and recesses (not shown). According to any preferred embodiment, the racks will be durable and transportable to the "remote" manufacturing facility for repeated use and reuse (during an extended useful life).

Referring to FIGS. 9 and 10, a loading orientation for delivering stacked racks 50 of panels 20 or shells 22 is shown on a trailer according to a preferred embodiment. Stacks of racks 50 filled with panels or shells may be secured with supports 80 and loaded onto a vehicle for transport. According to an exemplary embodiment, four layers of filled racks 50 may be vertically stacked and secured with supports 80, and then loaded end-to-end in rows spaced three-across within a standard size enclosed trailer 90 associated with a conventional tractor-trailer truck (as shown in FIG. 9) or the like. According to another exemplary embodiment, four layers of filled racks 50 may be secured by supports 80, and loaded side-to-side in rows spaced two-across on a standard-sized flatbed 92 of a trailer associated with a conventional tractor-trailer truck (as shown in FIG. 10) or the like, stacked racks 50 are shown protected from the elements by a tarp or cover 94 and secured to bed 92 by tie-downs 96. According to other alternative embodiments, the racks (filled or empty) may be stacked in any number of one or more layers and loaded in any configuration to suit the volume and weight capacity of any intended delivery vehicle (truck, trailer, train, ship, airplane, etc.).

Referring to FIG. 11, a manufacturing facility 42 for "locally" manufacturing panels 20, is shown schematically, according to a preferred embodiment. Facility 42 may include a plurality of stations arranged or configured to fit the shape or other constraints of facility 42 and for accomplishing the operations necessary to locally manufacture and deliver panels (i.e., filled) to an installation site. In a particularly preferred embodiment, these stations may include, among others, an unloading station 100 for unloading and unstacking racks 50 received from a delivery vehicle (e.g., as shown in FIGS. 9 and 10) and for preparing racks 50 for transport through the remaining stations; a fill station 102 connected to water supply and bulk fill material supply and a mixer (shown schematically) for mixing the fill material into a "liquid" mixture to fill the shells to form panels; an inspection station 104 for inspecting the fill level within the interior cavity of shells and refilling (i.e., "topping-off") if necessary; a closing station 106 for inserting covers or plugs when shells have been filled and pre-inspected; a prewash station 108 connected to a water supply for prewashing (e.g., rinsing, etc.) panels to remove excessive quantities of fill material from the exterior of panels; a washing station 110 having a washer (shown schematically), a water supply and a power supply for washing the exterior of panels (i.e., filled) to remove residual fill material; a drying station 112 having a dryer (shown schematically), a power supply and ventilation equipment (e.g., HVAC equipment) for drying panels; a final inspection station 114 to allow inspection of the quality and readiness of finished panels; a staging area or station 116 for loading panels onto pallets (shown schematically) or a movable cart (shown in FIG. 14A); and a local delivery station 118 having a transition 120 (e.g., ramp, power lift, etc.) for delivering panels 20 from facility 42 to installation site 46 (directly or alternatively to a delivery vehicle such as shown in FIGS. 9 and 10). According to other alternative embodiments, the manufacturing process may include fewer stations, or more stations or variations in the order or sequence or arrangement of stations that are appropriate for locally manufacturing panels. According to any preferred embodiment, the facility will have a through put capacity in a range of approximately 175 to 250 panels per hour.

Referring to FIG. 12, exemplary equipment for facility 42 is shown schematically according to a preferred embodiment. Facility 42 may be a fixed structure "local" to the installation site, or a mobile structure (e.g., truck, trailer, van, rail car, etc.) that is adapted to include the various manufacturing stations (shown in FIG. 11). In a particularly preferred embodiment, facility 42 is trailer or tractor-trailer outfitted with guides 130 (e.g., tracks or rails) located on or near floor 132 for movably guiding racks 50 through the various stations. Racks 50 may be placed on a mobile and portable base 134 (e.g., cart, dolly, etc.) that can periodically be cleaned and returned to unloading station 100 or returned to the remote or "initial" manufacturing facility for reuse. An electric power supply, water supply, and portable mixer may be provided for mixing the bulk fill material with water to create the fill mixture (if the fill material is not supplied per-mixed). According to a particularly preferred embodiment, the mixer is an auger type mixer providing compression mixing for rapidly and thoroughly mixing the fill mixture.

Figure 13:
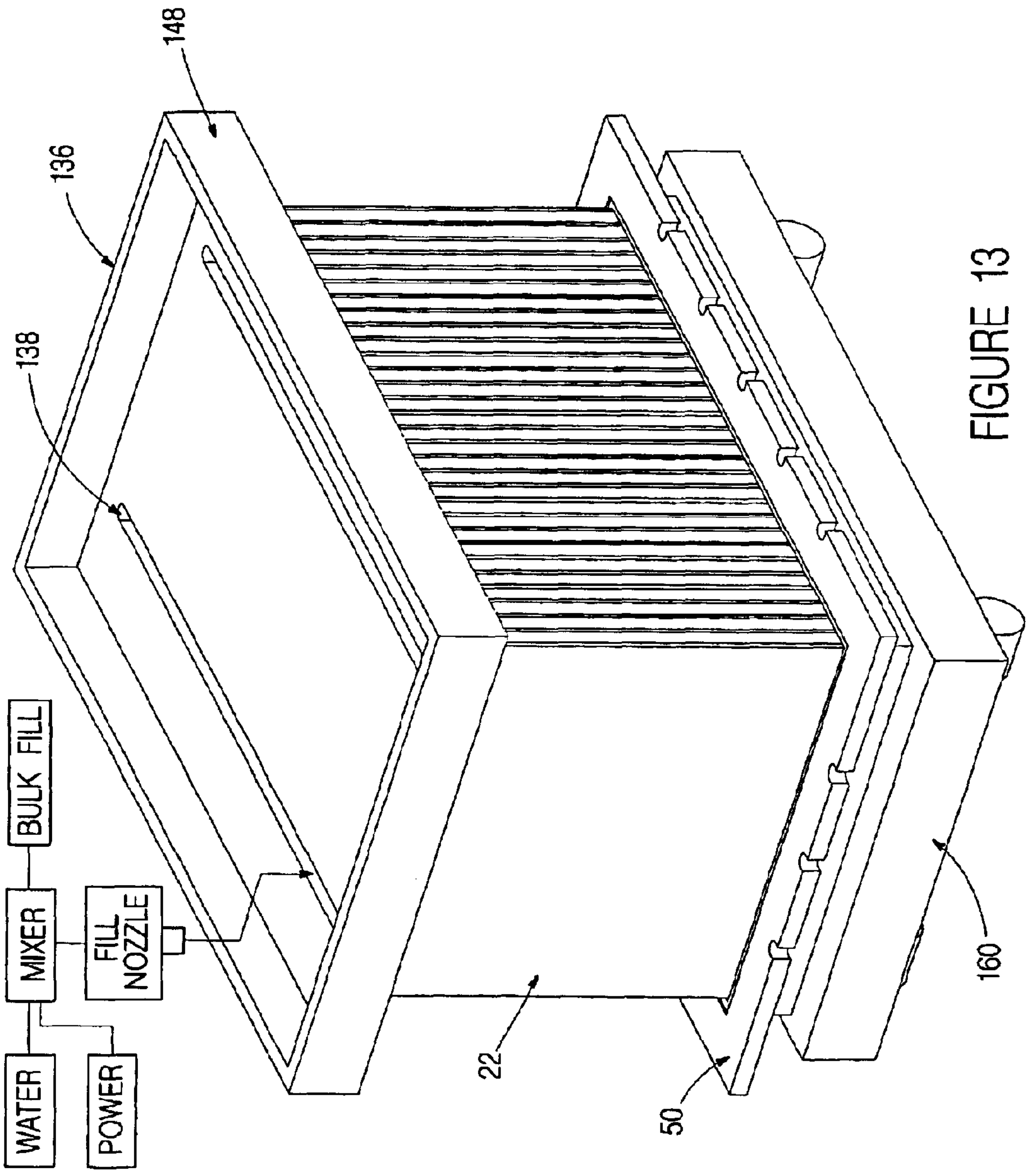
FIG. 13 is a perspective view of a fill template.

A portable and reusable shield or fill template 136 having apertures 138 (shown as slotted openings in FIG. 13) corresponding to fill apertures in the shells may be positioned above the shells at fill station 102 to direct the fill mixture into the fill apertures in shells 22 while intending to reduce overflow or spillage on the exterior of shells 22. Fill template 136 may provide a protective surface or shield for directing fill mixture into fill apertures 30 in shells 22 while minimizing the amount of spillage on the exterior surfaces of shells 22. In a particularly preferred embodiment, fill template 136 is made from a durable and washable material and may have two slots 138 sized and located to correspond to the size and location of fill apertures 30 in shells 22, whereby fill template 136 is positioned on shells 22 only once for filling all shells 22 in rack 50. Fill template 136 may also have a planar surface with raised sides 148 for containing excess fill material and may have a suitable structural feature (e.g., lip, slots, border, etc.) on an underside for aligning and maintaining fill template 136 in position during the fill process. According to other alternative embodiments, the fill template may have any suitable size and shape or feature (e.g., hoppers, funnels, etc.) for directing the fill mixture flow into the fill apertures in the shells and shielding the exterior of the shells from spillage (to the extent practicable).

A portable, pressurized water supply (shown schematically) attached to a flexible conduit and discharge fixture (e.g., hose and spray nozzle shown schematically) may be provided at prewash station 108 for removing excess amounts of fill material from the exterior of panels 20 (i.e., after being filled). An electric power supply (shown schematically) and a pressurized water supply (shown schematically) may be provided at washing station 110 for a washer 138. Washer 138 may have openings sized to allow access and egress of rack 50 with panels 20, that may be closed during operation of washer 138. In a particularly preferred embodiment, the washer may be a conventional-type industrial washing machine of a suitable size and capacity having liftable side doors. A series of interconnected drains or collectors 140 (shown as a drain pan and recirculation tank) may be provided to contain water and other fluids used at the prewash station and the washing station for reuse, processing and/or disposal. An electric power supply (not shown) and a forced ventilation supply (not shown) may be provided for a dryer 142. Dryer 142 may have openings sized to allow access and egress of rack 50 with panels 20, that may be closed during dryer operation. In a particularly preferred embodiment, dryer 142 may be a conventional-type industrial dryer for providing forced ventilation drying (and having side doors to allow access and egress of the racks with panels). A supply of pallets (not shown) and carts 160 (shown in FIG. 14) may be provided at staging station 116 for loading and delivering inspected panels. After delivery and removal of panels, empty racks 50 may be stacked (as shown in FIG. 8) and returned to the remote or "initial" shell manufacturer for reuse. According to other alternative embodiments, any type of equipment suitable for unloading, filling, prewashing, washing, drying, and delivering the panels may be employed or substituted.

Figure 14A:
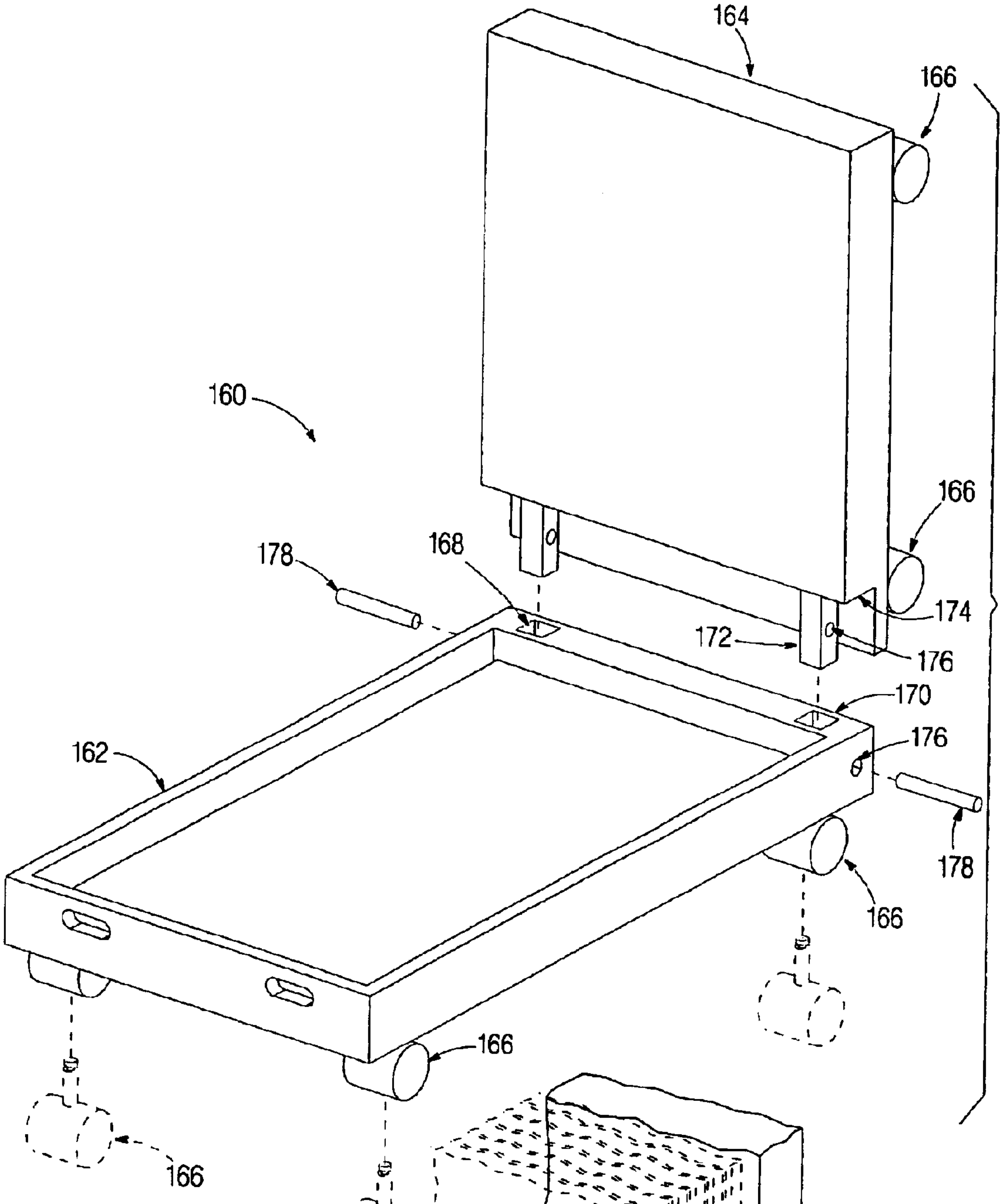
FIG. 14A is an exploded perspective view of a cart according to a preferred embodiment.
Figure 14B:
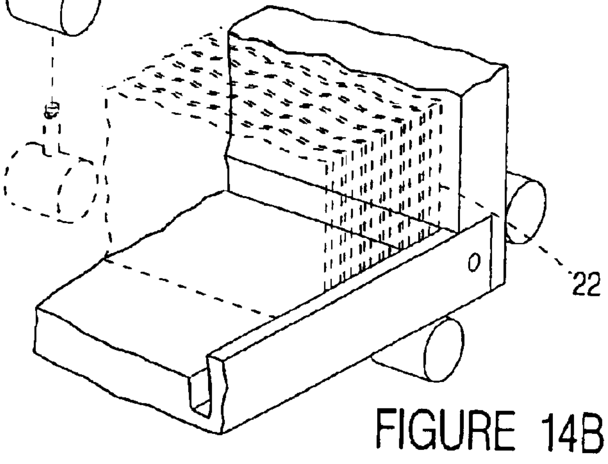
FIG. 14B is a fragmentary perspective view of the cart.

Referring to FIGS. 14A and 14B, a cart 160 is shown according to a preferred embodiment. Cart 160 may be mobile and capable of a first use of moving panels 20 in either a horizontal orientation or vertical orientation by rotating cart 160 vertically 90 degrees. Cart 160 may have a second use of providing a flat dolly-like support surface for transporting panels 20. As shown, cart 160 may have a removable bed or rack 162 lockably attached to a shelf or pallet 164. Rack 162 and pallet 164 may have removable wheels 166 (e.g., rollers, casters, etc.) for allowing cart 160 to be moved either vertically or horizontally. According to an exemplary embodiment, rack 162 may have a plurality of square apertures 168 and 170 for retaining square pegs 172 of pallet 164; whereby pallet 164 and rack 162 are interlocked in a perpendicular relation by pins 178 fit into apertures 176*b* (in rack 162) and aperture 176*a* (in square peg 172 of pallet 164) (as shown in FIG. 14B). According to other alternative embodiments, the cart may have handrails (not shown), wheel locks (not shown) or other conventional features or form suitable for transporting panels for transitioning panels from rack to pallet.

Referring to FIG. 15, transitioning of (e.g., rotation) of cart 160 is shown schematically as accomplished by a lift 180 (e.g., any suitable conventional lift mechanism). Cart 160 may be used in a horizontal position with a row of vertically oriented panels 20 loaded onto rack 162 for transporting panels 20 to any desired location. In a particularly preferred embodiment, cart 160 may be positioned over lift 180 (e.g., a manual lift, automatic lift, hydraulic jack, etc.) adapted to rotate cart 160 through approximately 90 degrees to a position where panels 20 are stacked horizontally and supported by pallet 164. A plurality of projections 34 (shown in FIG. 2C) provided on the underside of panels 20 may protect top surfaces 24 from abrasive contact with adjacent panels 20 (as well as providing suitable spacing for filling, rinsing, washing and drying operations). According to alternative embodiments, an overhead hoist (or any other suitable conventional mechanism, manual, electric, pneumatic, etc.—not shown) may be used to transition the cart from rack to pallet.

Figure 16A:
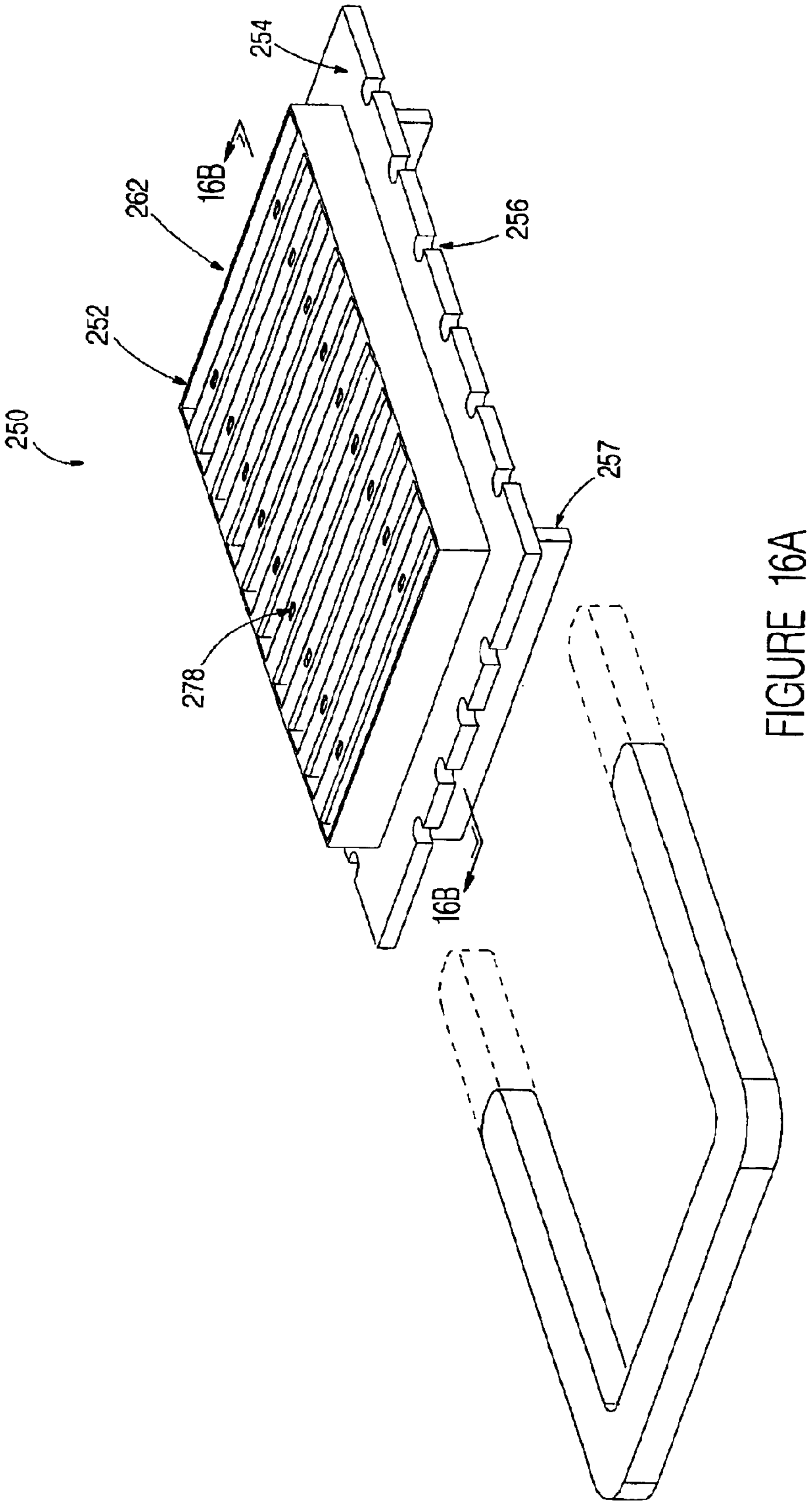
FIG. 16A is a perspective view of a rack according to an alternative embodiment.
Figure 16B:
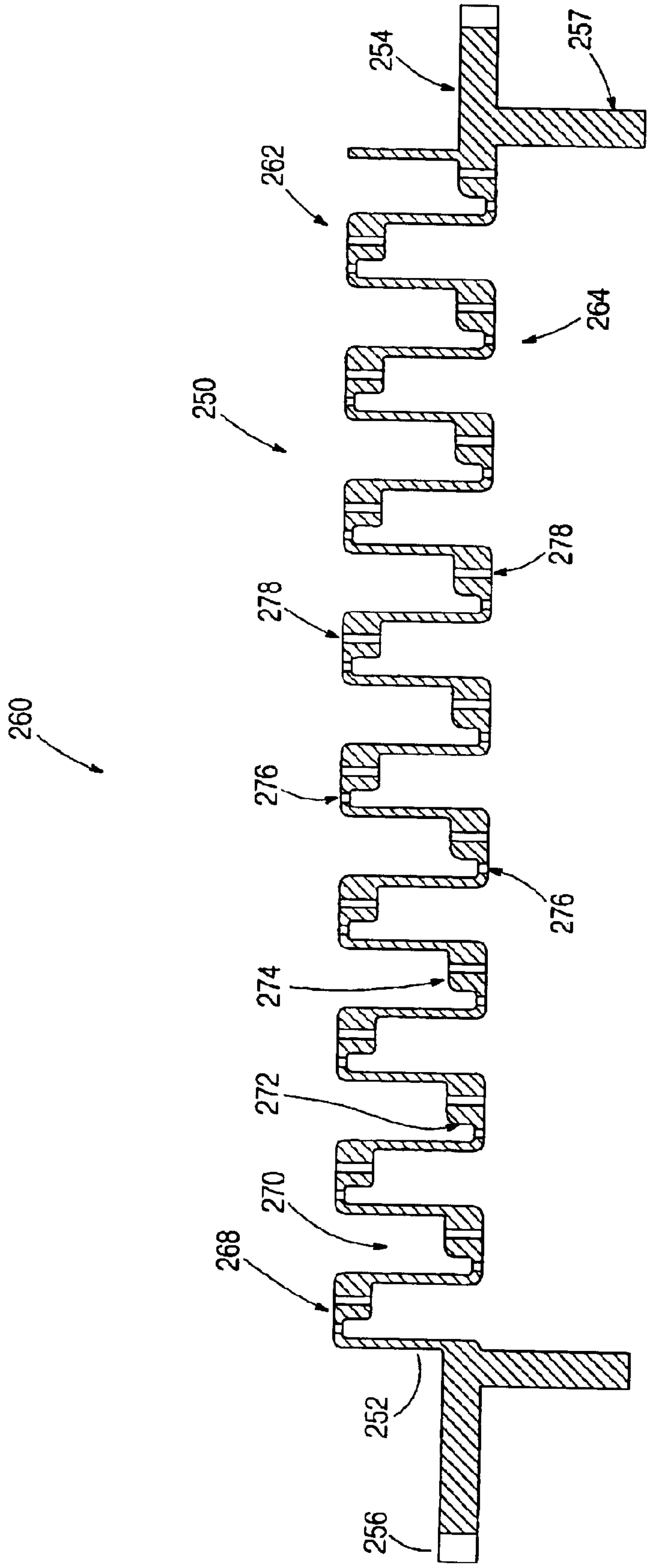
FIG. 16B is a cross sectional view of the rack.

Referring to FIGS. 16A and 16B, rack 250 is shown according to an alternative embodiment of the present invention. Rack 250 is generally rectangular and may have any suitable size for holding a plurality of panels or shells. Rack 250 may be rectangular and sized to hold and protect a plurality of panels 20 or shells 22 in a "spaced" arrangement (i.e. less "dense") that provides "pockets" with supporting surfaces for each panel or shell. In a particularly preferred embodiment, rack 250 is made of a durable and/or recyclable material (e.g., a structural plastic). Alternatively, the rack may be composed of any suitable material having the strength necessary for carrying a plurality of panels (e.g., steel, aluminum, rigid plastic, etc.). As shown, rack 250 may include a ledge 254 surrounding the perimeter, having notches 256 (with shape as shown) configured to securely retain a support 80 (shown in FIG. 19). Ledge 254 may be sized for engagement by a mobile lifting vehicle (e.g., forklift, etc.) when rack 250 is inverted or non inverted. Legs 257 may project downward from ledge 254 for positioning ledge 254 sufficiently above a floor surface (not shown) to allow mobile lifting devices to engage the underside of rack 250 or ledge 254. A center portion 252 projecting upward from ledge 254 may be provided having a series of retaining compartments 260 configured in a reversible pattern having a top surface 262 for holding a bottom end of panels 20 or shells 22, and a bottom surface 264 for holding a top end of panels 20 or shells 22. Retaining compartments 260 may consist of an alternating series of generally symmetric partitions 268 and channels 270, having a recess 272 and a shoulder 274 so that body 26 of panel 22 rests on shoulder 274 and panel ledge 28 extends into recess 272 (i.e., ledge 28 does not support the weight of panel 20). The interior walls of channel 270 provide a lateral support for holding panels 20 or shells 22 in an upright position. One or more apertures or drains 276 are provided through the bottom of each recess 272 to allow water to drain from rack 250 during the prewash and washing operations, and one or more fill apertures 278 may be provided in the top of each partition 268 corresponding to the fill apertures 30 in shells 22 to provide a passage for filling shells 22 when rack 250 is stacked on top of another rack of shells 22. When stacked, racks 250 may be alternatively inverted to maintain the vertical alignment of the stacked racks (shown in FIG. 17).

Figure 17:
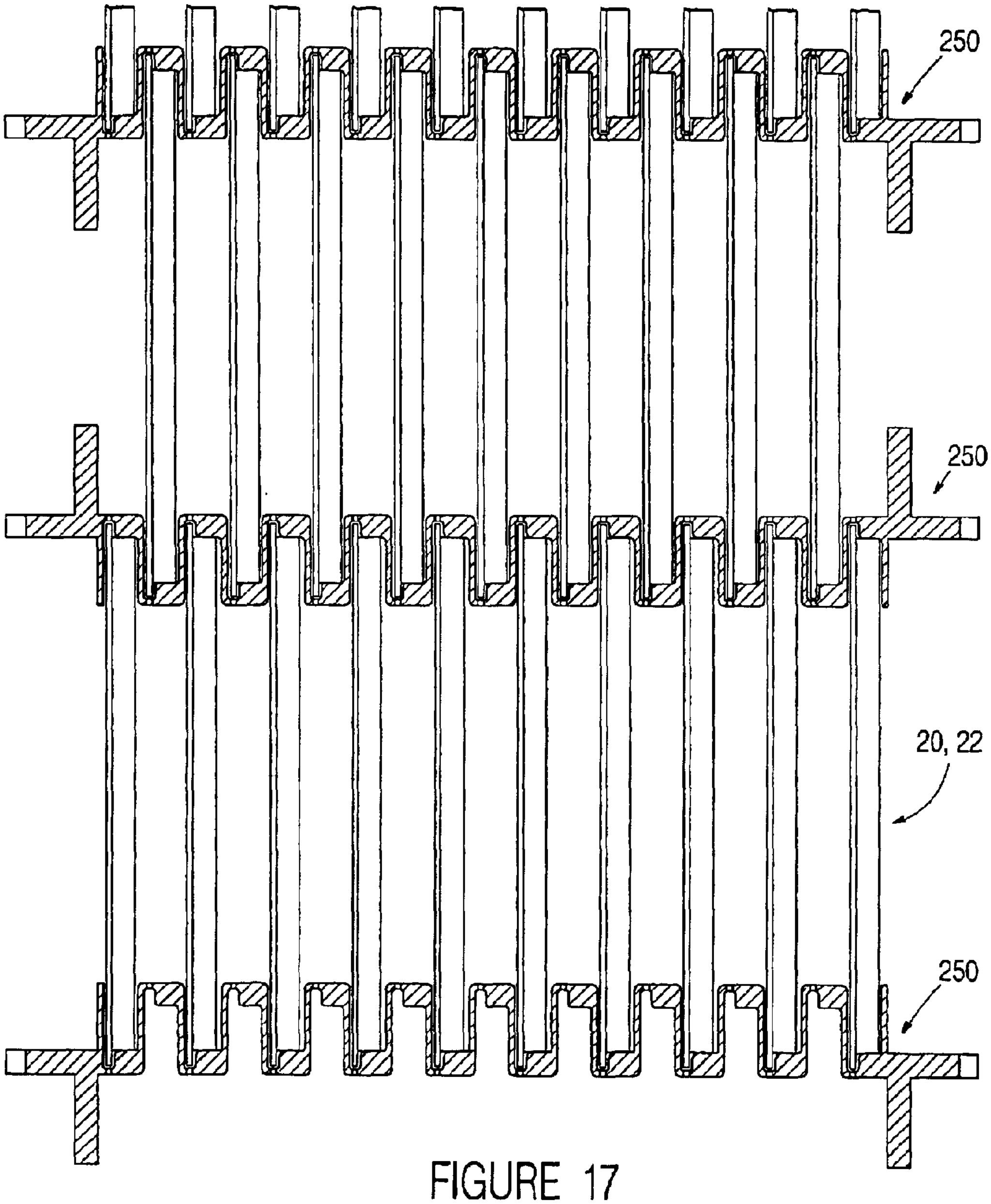
FIG. 17 is a cross sectional view of stacked racks according to an alternative embodiment.

Referring to FIG. 17, a series of vertically stacked racks 250 holding panels 20 or shells 22 is shown according to a alternative embodiment. A top rack may be provided on top of the stack to secure and protect the top ledges 28 of the panels 20 or shells 22 in an upper most rack. Racks 250 may be alternatively inverted to maintain the stacked racks in vertical alignment (and stocked with a suitable number of panels or shells).

Figure 18:
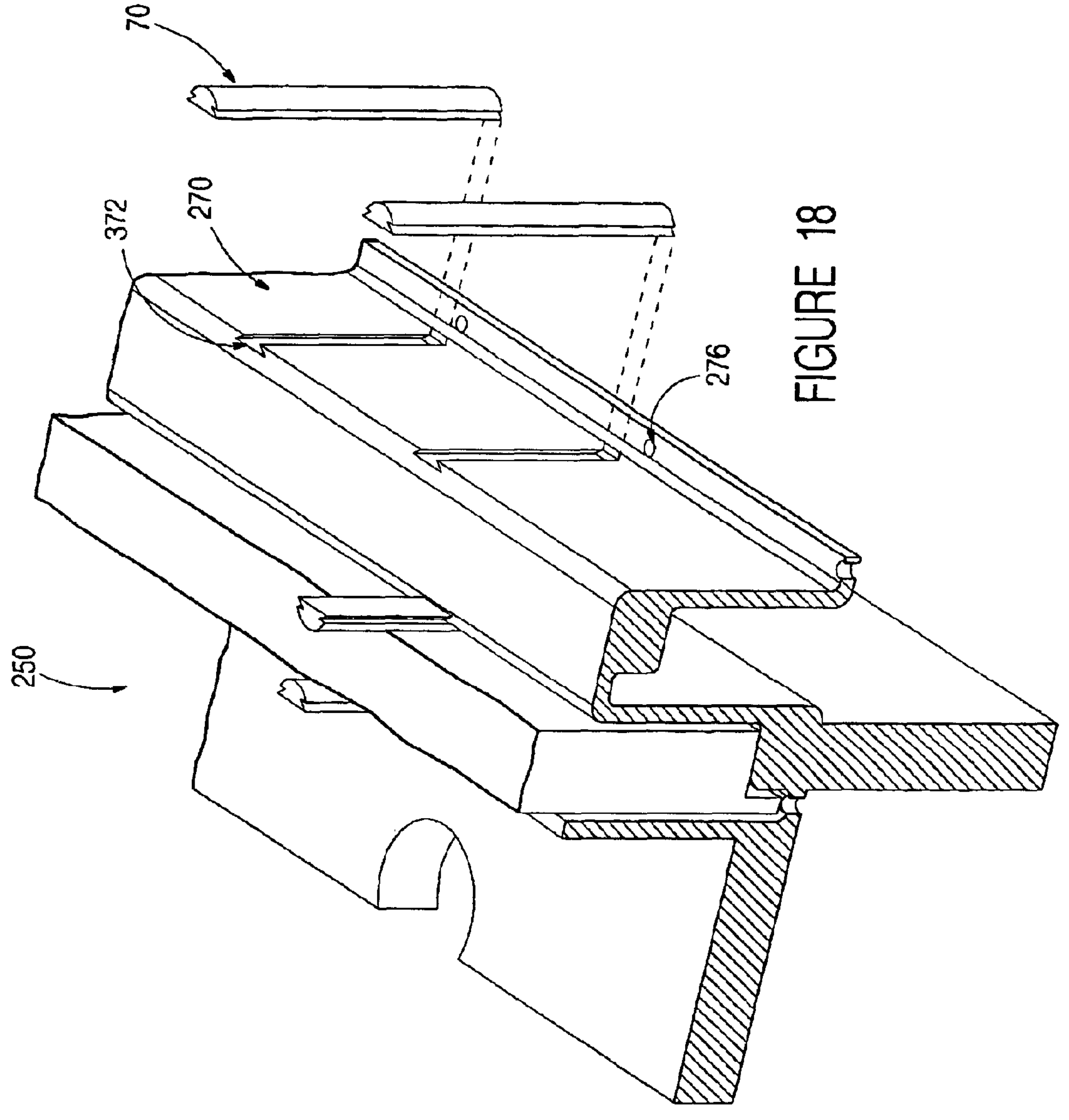
FIG. 18 is a fragmentary perspective view of a rack according to an alternative embodiment.

Referring to FIG. 18A, one or more wear or rub strips 70 for protecting the top surface of panels or shells from abrasive contact with an inner wall of channels 270 are shown according to an alternative embodiment. Strips 70 may be made of a resilient material such as rubber and shaped for slidable removal and installation in keyways 372 spaced along an inner wall of one or more channels 270. Protectors 70 may have a rounded profile (as shown in FIG. 6B) intended to cushion and protect the surface of shells 22 or panels 20 (as shown in FIG. 6C). Protectors 70 may have a length that projects slightly above the top of partition 268 to facilitate manual grasping and slidable removal from keyway 372 for replacement when protectors 70 become worn.

Figure 19:
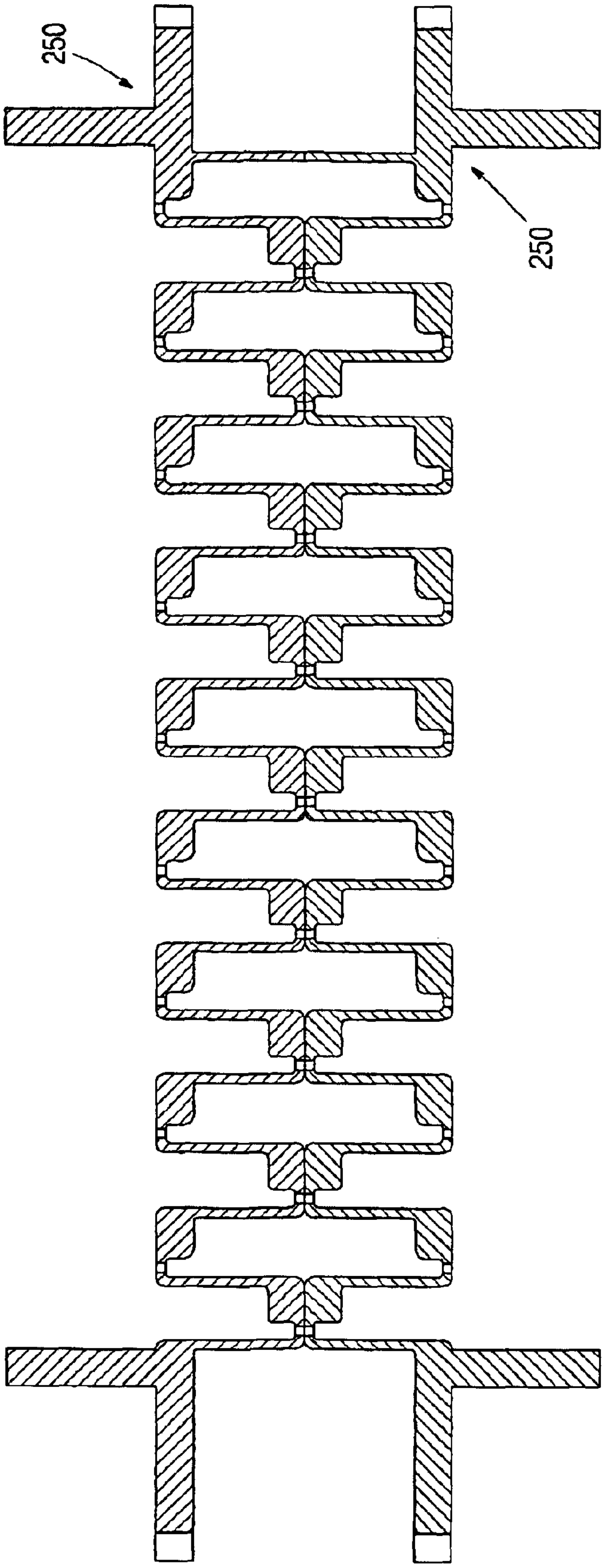
FIG. 19 is a cross sectional view of stacked (empty) racks according to an alternative embodiment.

Referring to FIG. 19, empty racks 250 may be vertically stacked according to an alternative embodiment of the present invention. Racks 250 may be stacked in a back-to-back configuration, whereby the symmetrically opposed partitions 268 and legs 257 provide a contact surface for supporting successive layers of racks.

Figure 20A:
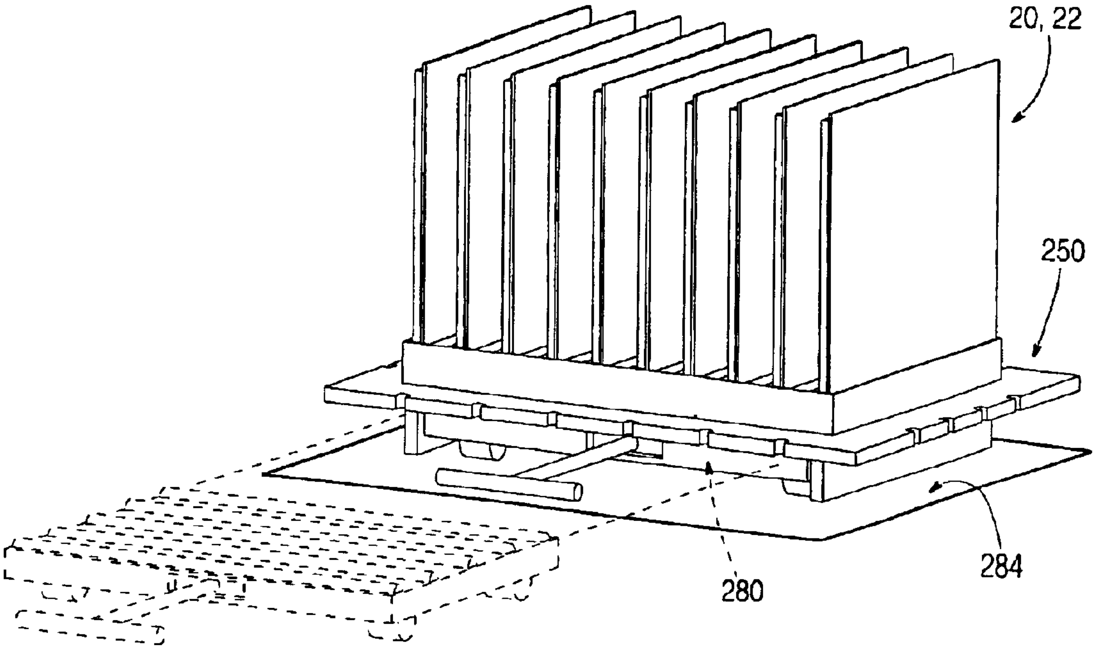
FIG. 20A is a perspective view of a stationary rack according to an alternative embodiment.
Figure 20B:
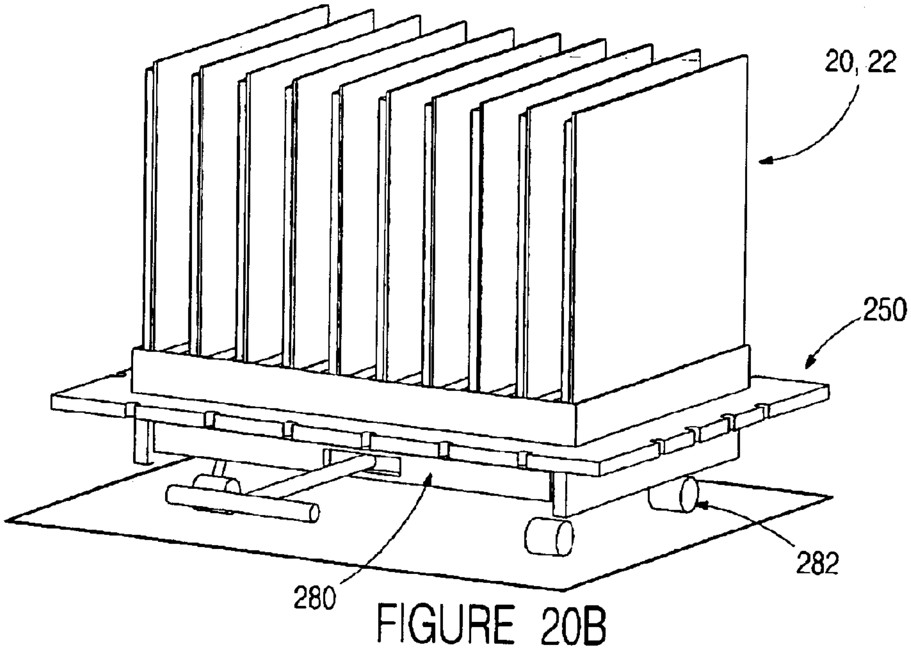
FIG. 20B is a perspective view of a lifted rack according to an alternative embodiment.

Referring to FIGS. 20A and 20B, racks 250 holding panels 20 or shells 22 may be moved according to an alternative embodiment of the present invention. A mobile lifting device 280 (shown as a floor jack) having wheels 282 (shown as rollers) may be positioned between legs 257 to engage the underside of rack 250 (as shown in FIG. 20A). Mobile lifting device 280 may have a series of ribs oriented horizontally and perpendicular to partitions 268 on the bottom of rack 250 to provide a non-skid contact surface. Elevating mobile lifting device 280 a sufficient height to raise legs 257 from floor 284 (as shown in FIG. 20B) may allow rack 250 to be manually moved to a desired location and facilitate delivery of panels for placement at an installation site.

According to exemplary embodiments, the depth of base or body of the panel may be in the range of approximately ⅞ inch to 1.5 inches; in a particularly preferred embodiment the depth may be approximately 1.25 inches. According to alternative embodiments, other depths greater than 1.5 inches or less than ⅞ inch may be used for the panel. It should also be noted that alternatively, panel 20 may be of a uniformly square or rectangular shape having no ledge (not shown) and the base or body 26 supported directly on stanchion 19 (e.g., the weight of panel 20 and the abutting adjacent panels in floor system 10 maintain panels 20 in proper position). The shape of the shell may be square or rectangular and the size of the shell may be any size suitable for creating a panel having sufficient strength for use in the floor system yet has a weight that is reasonable for manual installation.

It is also important to note that the construction and arrangement of the elements of the process for manufacturing floor panels as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A method for manufacturing tiles for use in a raised floor system, the tiles comprising an outer shell and an inner core material, the method comprising steps of:

constructing the shells at a manufacturing facility;

loading the shells into a rack comprising a support flange and top and bottom faces having a plurality of elongated pockets adapted to receive an edge of a shell so that the shells are supported on the rack in a generally vertical orientation;

transporting the shells to a remote location associated with a job site; and filling the shells with a fill material at the remote location to form tiles.

2. The method in claim 1 wherein the remote location is a construction site.

3. The method of claim 1 further comprising the step of cleaning the tiles.

4. The method of claim 3 wherein cleaning includes washing the tiles.

5. The method of claim 3 wherein cleaning includes drying the tiles.

6. The method of claim 1, further comprising the step of loading the shells into a rack.

7. The method of claim 6, further comprising the step of holding the shells in a substantially vertical orientation in the rack.

8. The method of claim 6, further comprising the step of protecting a lower edge of the shells in the rack.

9. The method of claim 6, further comprising the step of moving the rack through a plurality of stations, whereby one or more manufacturing operations may be performed on the shells.

10. The method of claim 1, further comprising the step of providing a racking system, wherein the racking system includes a plurality of racks, each of the racks having a peripheral support flange, each of the racks further having top and bottom faces having a plurality of elongated pockets, each of the elongated pockets adapted to receive an edge of the tile so that a row of the tiles are supported on each of the racks in a generally vertical orientation.

11. The method of claim 10, further comprising the step of stacking the racks with the row of the shells on each in a vertical orientation.

12. The method of claim 11, further comprising the step of engaging a support rod with the peripheral support flange to secure the racks.

13. A method for manufacturing tiles for use in a raised floor system, the tiles comprising an outer shell and an inner core material, the method comprising steps of:

constructing the shells at a manufacturing facility;

providing a plurality of bosses on a bottom plate of the shells so that when stacking the shells the bosses on the bottom plate of one of the shells contacts a top plate of an adjacent shell to provide a clearance between the shells;

transporting the shells to a remote location associated with a job site; and filling the shells with a fill material at the remote location to form tiles.

14. The method in claim 13 wherein the remote location is a construction site.

15. The method of claim 13 further comprising the step of cleaning the tiles.

16. The method of claim 15 wherein cleaning includes washing the tiles.

17. The method of claim 15 wherein cleaning includes drying the tiles.

18. A method for manufacturing tiles for use in a raised floor system, the tiles comprising an outer shell and an inner core material, comprising:

constructing the shells at a manufacturing facility;

loading the shells into a rack configured to hold and protect the shells comprising a horizontal tray having a top side, a bottom side, and a vertical wall extending from the horizontal tray, and an extension projecting outward from the vertical wall;

transporting the shells to a remote location associated with a job site; and filling the shells with a fill material at the remote location to form tiles.

19. The method of claim 18, further comprising the step of loading the shells into the rack.

20. The method of claim 19, further comprising the step of holding the shells in a substantially vertical orientation in the rack.

21. The method of claim 19, further comprising the step of protecting a lower edge of the shells in the rack.

22. The method of claim 19, further comprising the step of moving the rack through a plurality of stations, whereby one or more manufacturing operations may be performed on the shells.

23. A method for manufacturing tiles for use in a raised floor system, the tiles comprising an outer shell and an inner core material, the method comprising steps of:

providing a rack to hold the shells during the manufacturing process;

stacking the shells in a vertical orientation on the rack;

filling the shells with a cementious mixture core material while on the rack to form tiles; and cleaning the tiles while on the rack.

24. The method of claim 23 further comprising the step of removing the tiles from the rack.

25. The method of claim 23 wherein cleaning includes washing the tiles.

26. The method of claim 23 wherein cleaning includes drying the tiles.

27. A method for manufacturing tiles for use in a raised floor system, the tiles comprising an outer shell and an inner core material, the method comprising steps of:

constructing the shells at a manufacturing facility;

providing a rack to hold the shells during the manufacturing process, loading the shells in a generally vertical orientation on the rack;

transporting the shells while on the rack to a remote location associated with a job site;

filling the shells with a core material while on the rack at the remote location to form tiles; and cleaning the tiles while on the rack at the remote location.

28. The method of claim 27 further comprising the step of removing the tiles from the rack.

29. The method of claim 27 wherein cleaning includes washing the tiles.

30. The method of claim 27 wherein cleaning includes drying the tiles.

31. The method of claim 27 wherein the remote location is a construction site.

32. The method of claim 27, further comprising the step of providing a structure adapted to conduct one or more manufacturing operations on the shells, the structure including a receiving station adapted to receive the shells, a filling station adapted to fill the shells with the core material to form the tiles, a washing station adapted to wash the tiles, a drying station adapted to dry the tiles, an inspection station adapted to inspect the tiles, and a delivery station adapted to deliver the tiles to a local installation site.

33. A method of manufacturing panels comprising the steps of:

manufacturing a plurality of shells at a remote facility;

loading the shells into a plurality of racks;

delivering the shells to a local facility;

receiving the shells at a local facility;

filling the shells with a filling material to create panels;

washing the panels;

drying the panels;

inspecting the panels; and delivering the panels to a local installation site.

34. The method of claim 33 wherein the step of filling the shells includes the step of receiving a supply of dry bulk filler material.

35. The method of claim 34 wherein the step of filling the shells includes the step of mixing the dry bulk filler material with water to create the filling material.

36. The method of claim 33 wherein the step of filling the shells includes the step of pouring the filling material into the shells through an aperture.

37. The method of claim 36 wherein the step of filling the shells includes the step of closing the panels by inserting a cover in the aperture.

38. The method of claim 33 wherein the step of loading the shells into a rack further includes the step of stacking the plurality of racks to form a plurality of vertical stacks.

39. The method of claim 38 wherein the vertical stacks are delivered to a local facility.

40. The method of claim 39 wherein the local facility is a mobile trailer.

41. The method of claim 39 wherein the local facility is a structure located at the installation site.

* * * * *